(12) United States Patent
Heminway et al.

(10) Patent No.: US 7,369,913 B2
(45) Date of Patent: May 6, 2008

(54) RECIPE EDITOR AND CONTROLLER

(75) Inventors: Merrit Heminway, Knoxville, TN (US); Ronald E. Majoras, Knoxville, TN (US); Brian Best, Maryville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 399 days.

(21) Appl. No.: 10/817,529

(22) Filed: Apr. 2, 2004

(65) Prior Publication Data

US 2005/0228523 A1    Oct. 13, 2005

(51) Int. Cl.
    *G06F 19/00*  (2006.01)
(52) U.S. Cl. .................. 700/100; 700/97; 700/266
(58) Field of Classification Search .......... 700/86, 700/96–97, 100, 266; 717/100
    See application file for complete search history.

(56) References Cited

U.S. PATENT DOCUMENTS

| 5,499,188 | A  | * | 3/1996  | Kline et al. ............. 700/106 |
| 5,838,563 | A  |   | 11/1998 | Dove et al. |
| 5,901,062 | A  |   | 5/1999  | Burch et al. |
| 6,415,193 | B1 |   | 7/2002  | Betawar et al. |
| 6,522,934 | B1 |   | 2/2003  | Irwin et al. |
| 6,665,575 | B2 |   | 12/2003 | Betawar et al. |
| 6,684,122 | B1 | * | 1/2004  | Christian et al. ......... 700/121 |
| 6,697,690 | B2 |   | 2/2004  | Scholl et al. |
| 6,994,827 | B2 | * | 2/2006  | Safir et al. ............. 422/100 |
| 2003/0144746 | A1 |   | 7/2003  | Hsiung et al. |
| 2003/0195779 | A1 |   | 10/2003 | Scholl et al. |
| 2003/0196186 | A1 |   | 10/2003 | Scholl et al. |
| 2003/0222905 | A1 |   | 12/2003 | Wierenga et al. |
| 2005/0187649 | A1 | * | 8/2005  | Funk et al. ............. 700/121 |

OTHER PUBLICATIONS

"GE Coincidence," FDG Synthesis Manual, Dec. 18, 2001, (87 pgs).
"LabVIEW User Manual," National Instruments, Apr. 2003, Austin, TX, (349 pgs).
"Gina Star: Interface Analyse & HPLC control Software," raytest isotopenmessgerate GmbH, Benzstrasse 4, 75334 Straubenhardt, (4 pgs).
"GINA-Star Radiochromatography System User Manual," raytest isotopenmessgerate GmbH, Benzstrasse 4, 75334 Straubenhardt, (89 pgs).

* cited by examiner

*Primary Examiner*—Alexander Kosowski

(57) ABSTRACT

Apparatus and methods for automating a sequence of basic chemistry operations through a recipe. Software running on a workstation communicating with a controller allows an operator to operate the process controller, view the process, log the process, and maintain the recipe. The controller communicates with the process hardware and receives commands from the workstation, stores the commands, interprets the commands to perform the process, and provides monitoring information to the workstation. The workstation software uses a recipe to control the process. The recipe is expressed in terms of the process. The controller runs software routines for process control and for hardware control.

70 Claims, 16 Drawing Sheets

920 Evaporate Unit Opertion

906 Control Chamber Temperature

1002 Set Temperature

PC Out — 1004

HwC Out — 1006

908 Monitor Rx Vessel Temperature

PC Read — 1012

HwC In — 1014

Store Value — 1016

Fig. 10

RECIPE EDITOR AND CONTROLLER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to apparatus and methods for automating a sequence of basic chemistry operations. More particularly, this invention pertains to software that allows an operator to control a process through a recipe. The operator is isolated from having to manipulate the hardware to control the process.

2. Description of the Related Art

A process flow is a sequence of chemical, physical, and/or biological activities for the conversion, transport, or storage of material or energy. Process controllers manipulate hardware to ensure that a process flow is completed in a satisfactory manner. Prior art process controllers present to an operator information directly related to the hardware. Present-day process control systems use instruments, control devices, and communication systems to monitor and manipulate controlled elements, such as valves and switches, and to control the values of one or more process variables, including temperature, pressure, flow, etc. The process variables are selected and controlled to achieve a desired process objective, such as attaining the safe and efficient operation of machines and equipment utilized in the process. Process control systems have widespread application in the automation of industrial processes such as the processes used in chemical, petroleum, and manufacturing industries, for example.

Control of a process is often implemented using microprocessor-based controllers, computers, or workstations which manipulate and monitor the process by sending and receiving commands and data to hardware devices to control either a particular aspect of the process or the entire process as a whole. The specific process control functions that are implemented by software programs in these microprocessors, computers, or workstations may be individually designed, modified, or changed through programming while requiring no modifications to the hardware. For example, an engineer might cause a program to be written to have the controller read a fluid level from a level sensor in a tank, compare the tank level with a predetermined desired level, and then open or close a feed valve based on whether the read level was lower or higher than the predetermined, desired level. The parameters are easily changed by displaying a selected view of the process and then by modifying the program using the selected view. The engineer typically would change parameters by displaying and modifying an engineer's view of the process. Such an engineer's view is typically represented by a piping and instrumentation diagram (P&ID) or other representation of the hardware. In addition to executing a process, software programs also monitor and display a view of the process, providing feedback in the form of an operator's display or view regarding the status of particular process variables.

Prior art process controllers are programmed by defining parameters that affect the hardware performing the process. For example, LabVIEW by National Instruments is a software package that allows an operator to control a process through a program running on a processor. The program uses graphical objects that correspond to the engineering objects or functions in the process hardware. The software uses a block diagram that includes terminals, noted, and functions that represent the process. These elements are connected by graphical wires. The resulting block diagram is an engineering description of the process.

Specialized software packages exist for specific applications. For example, Gina Star by raytest Isotopenmessgarete GmbH is a radio-chromatography control system and GE Coincidence by General Electric Medical Systems is an FDG synthesizer control system. Both systems control a specific process through a user interface that allows the operator to manipulate the hardware and operating parameters.

Various patents disclose similar systems for maintaining process control recipes. U.S. Pat. No. 5,838,563, titled "System for Configuring a Process Control Environment," issued to Dove, et al., on Nov. 17, 1998, discloses a software system for configuring and modifying a process control environment 100. The system disclosed by the '563 patent includes a control studio object system 130 that interacts with a template generator 120 and allows for manipulating a plurality of stencil items representing objects containing information necessary to program the process control environment 100. The stencil items are copied via a drag and drop operation to a diagram portion that represents the process control environment 100. The design environment allows creating or modifying control functions graphically with ladder logic, continuous function block, or other design languages.

U.S. Pat. No. 6,697,690, titled "Customizing process flows," issued to Scholl, et al., on Feb. 24, 2004, discloses a method for customizing a process flow that includes receiving a recipe hierarchy describing the process flow. The '690 patent describes three types of recipes: a general recipe includes information related to the process flow without necessarily identifying the resources to be used to perform the process, a site recipe includes site-specific information with local constraints, and a master recipe includes resource capabilities and describes the recipe for a specific production on a specific line. The '690 patent discloses combining resource information and the general recipe to customize the execution of the process such that the recipe is performed with specific resources. United States Patent Application Number 2003/0195779, titled "Change management of recipes," published for Scholl; et al., on Oct. 16, 2003, is related to the '690 patent. The published application discloses a management system for variant recipes received by a system. The recipes differ in various ways, either by the steps performed or by the results. The system groups the variant recipes according to a class characteristic.

United States Patent Application Number 2003/0196186, titled "Building blocks for describing process flows," published for Scholl; et al., on Oct. 16, 2003, discloses a method for generating general recipes using root-independent building blocks, which are converted into a master recipe. The '186 published application describes three types of recipes: a general recipe including information related to the process flow without necessarily identifying the resources to be used to perform the process, a site recipe including site-specific information with local constraints, and a master recipe including resource capabilities and describing the recipe for a specific production on specific hardware. The '186 published application defines a recipe 100 as a hierarchy that includes a root recipe element 105, of which a recipe 100 need have only one. The root element 105 describes the process flow in general terms and includes a sequence of process stages 110, each of which can be divided into a set of process operations 115. The process stages 110 result in a planned sequence of chemical or physical changes in the material being processed. The process operations 115 are defined independently of the target equipment configuration. Each process operation 115 is further divided into a set of process actions 120. The process actions 120 describe a relatively minor processing act in relatively great detail. Accordingly, the recipe 100 is a hierarchy with four levels: a root element 105, a sequence of process stages 110, a set of process operations 115, and a set of process actions 120.

The recipe 100 of the '186 published application is assembled from root-independent building blocks 205, 210, 215, 220 that correspond to the root element 105, the sequence of process stages 110, the process operations 115, and the process actions 120, respectively. A user selects desired, appropriate building blocks using an input/output device 720, which sends the information to a central system 705. The central system 705 receives the building blocks and stores them in a library 730. The central system 705 also allows customization of the building blocks. To execute the recipe 100, the user identifies the operation system 710 to perform the process flow, and the central system 705 requests and receives the equipment capabilities stored in an equipment library 760 from the operational system 710. The central system 705 then converts, using conversion logic 755, the identified general recipe into a master recipe, which is transmitted to the operational system 710 for execution.

Process control software is used extensively in the semiconductor industry. For example, U.S. Pat. No. 5,901,062, titled "Semiconductor structure design and process visualization through the use of simple process models and intuitive interfaces," issued to Burch, et al., on May 4, 1999, discloses a semiconductor structure design and process visualization tool for adding, editing, or deleting process steps to create a process flow. The tool disclosed in the '062 patent creates processes from simple abstract models using physical parameters of the resulting device layer rather than specific process conditions needed to form the structure, such as process chemicals used, temperature, and duration.

U.S. Pat. No. 6,415,193, titled "Recipe editor for editing and creating process recipes with parameter-level semiconductor-manufacturing equipment," issued to Betawar, et al., on Jul. 2, 2002, discloses a universal recipe editor is for off-line viewing and editing of semiconductor-manufacturing recipes. Semiconductor processing, inspection, metrology, and measurement machines each require a set of operating instructions (a processing program) or a "recipe". The recipe for each machine defines the operations and engineering parameters necessary for the machine to perform a particular operation or process. Because the machines have different formats and requirements for specifying its unique recipe, the '193 patent discloses an off-line editor of machine recipes. U.S. Pat. No. 6,665,575, titled "Recipe editor for editing and creating process recipes with parameter-level security for various kinds of semiconductor-manufacturing equipment," issued to Betawar, et al., on Dec. 16, 2003, is a division of the '193 patent.

United States Patent Application Number 2003/0222905, titled "Recipe recorder for automated chemistry," published for Wiernga, et al., on Dec. 4, 2003, discloses a recipe recorder that allows for the recording of the execution of recipe for later editing or playback. The '905 publication identifies two problems with automated chemistry systems. First, programming such systems is time consuming and takes the chemist away from tasks for which the chemist is better trained. Second, the ability to program such systems is a skill that few chemists possess, which results in others without the chemistry skills performing the programming or the chemist attempting to program the system. Either approach is subject to errors and inefficiencies.

BRIEF SUMMARY OF THE INVENTION

According to one embodiment of the present invention, apparatus and methods for automating a sequence of basic chemistry operations is provided. This invention provides software used with a process control system. The software uses a recipe metaphor to allow a chemist or other operator to interact with the system without requiring engineering knowledge of the process.

A workstation provides an interface for monitoring the process, tracing and logging the process, controlling the process, and creating and editing the recipes. The workstation communicates with a controller that receives the recipe for execution. The controller communicates with the process hardware. The software executed by the controller includes two modules. The first module is the process control and executes the recipe. The second module is the hardware control, which provides an interface between the process control and the process hardware.

BRIEF DESCRIPTION OF THE SEVERAL VIEWS OF THE DRAWINGS

The above-mentioned features of the invention will become more clearly understood from the following detailed description of the invention read together with the drawings in which:

FIG. 10 is a partial flow diagram of one embodiment of the sub-steps for an evaporate unit operation;

DETAILED DESCRIPTION OF THE INVENTION

Apparatus and methods for automating a sequence of basic chemistry operations is disclosed. A process control system, generally referred to as 10, includes hardware and software for controlling a process. The process control system 10 uses a recipe metaphor to allow a chemist or other operator to interact with the system without requiring engineering knowledge of the process.

A process flow is a sequence of chemical, physical, and/or biological activities or steps for the conversion, transport, or storage of material or energy. A recipe includes information related to a specific process flow for the production of a product. Recipes can also include definitions of resources such as equipment that is deployed to perform the process flow, as well as materials input to perform the process flow and output materials resulting from performance of the process flow.

One example of a process control system 10 is a system for the production of radiopharmaceuticals, such as fluorodeoxyglucose (FDG), a radiopharmaceutical used with PET (positron emission tomography) scanners. In one embodiment, a recipe is a sequence of chemistry operations such as reagent addition, evaporation, and cooling that can be strung together to synthesize radiopharmaceuticals or perform some other batch process such as cleaning. The use of the example relating to radiopharmaceutical synthesis is not intended to limit the invention. The individual steps of a recipe are referred to as unit operations.

A recipe includes a plurality of unit operations, arranged in sequential order. In one embodiment, the process flow is chemical in nature and the unit operations are expressed in terms familiar to a chemist. In this embodiment, the chemist defines the recipe in terms of the parameters relating to the process flow. The chemist makes changes to the recipe based on the results obtained from other recipes without being concerned with specifying changes in engineering terms, that is, by controlling the hardware. In one embodiment, the unit operations have associated resource information, such as necessary reagents or materials. In another embodiment, the unit operations have properties detailing process variables and parameters, for example a specific temperature.

Figure 1:
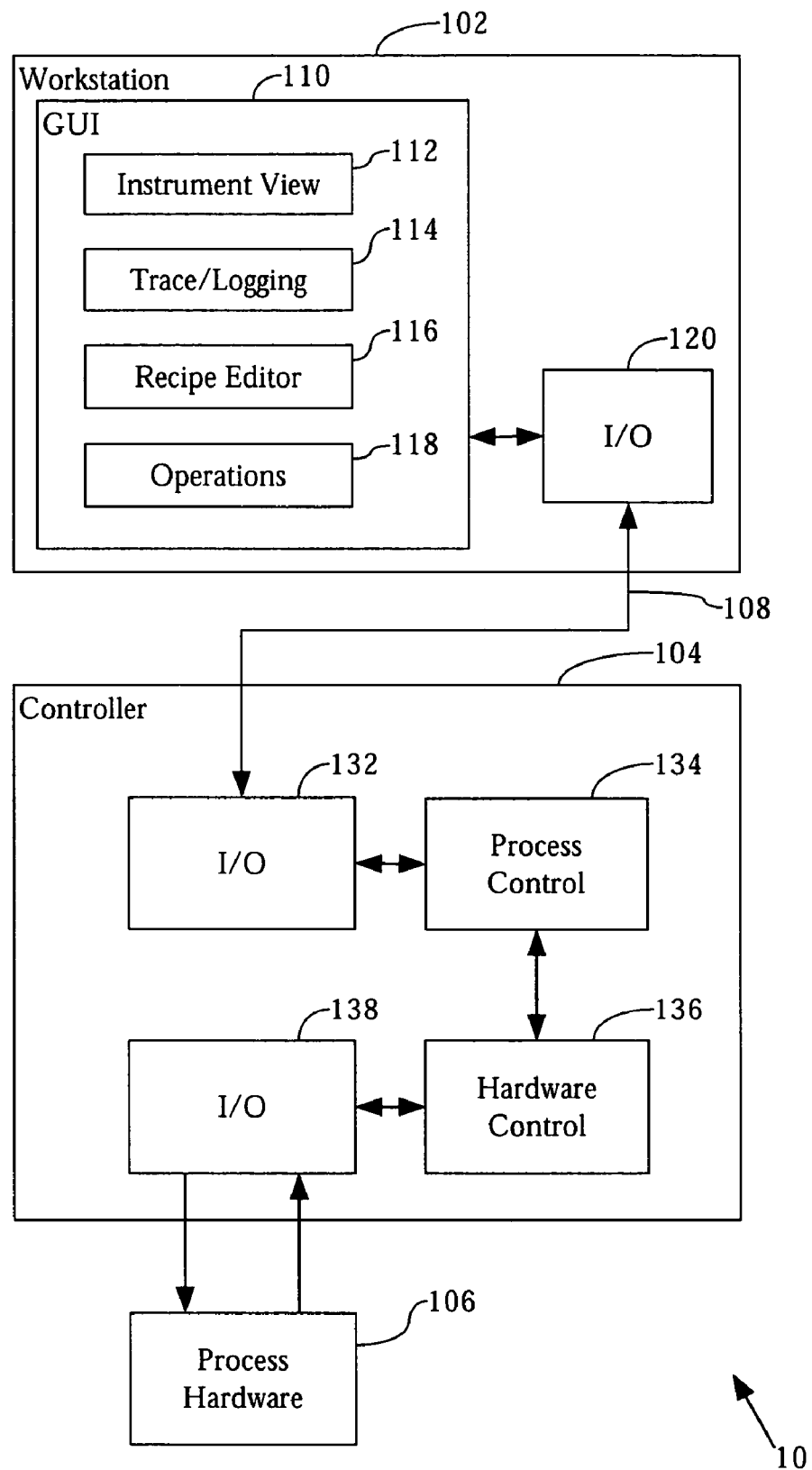
FIG. 1 is a flow diagram of one embodiment of the process control system.

FIG. 1 illustrates one embodiment of the process control system 10.

A workstation 102 communicates with a controller 104 that communicates with the process hardware 106. The workstation 102 provides process flow control and monitoring. Also, the workstation 102 allows the unit operations to be organized into recipes. The operator at the workstation 102 deals with the process flow at a high, or abstract level. The controller 104 processes the recipe and controls and monitors the process hardware 106. The controller 104 provides the bridge between the abstract level at the workstation 102 and the low level dealing with specific hardware required by the process hardware 106.

Figure 2:
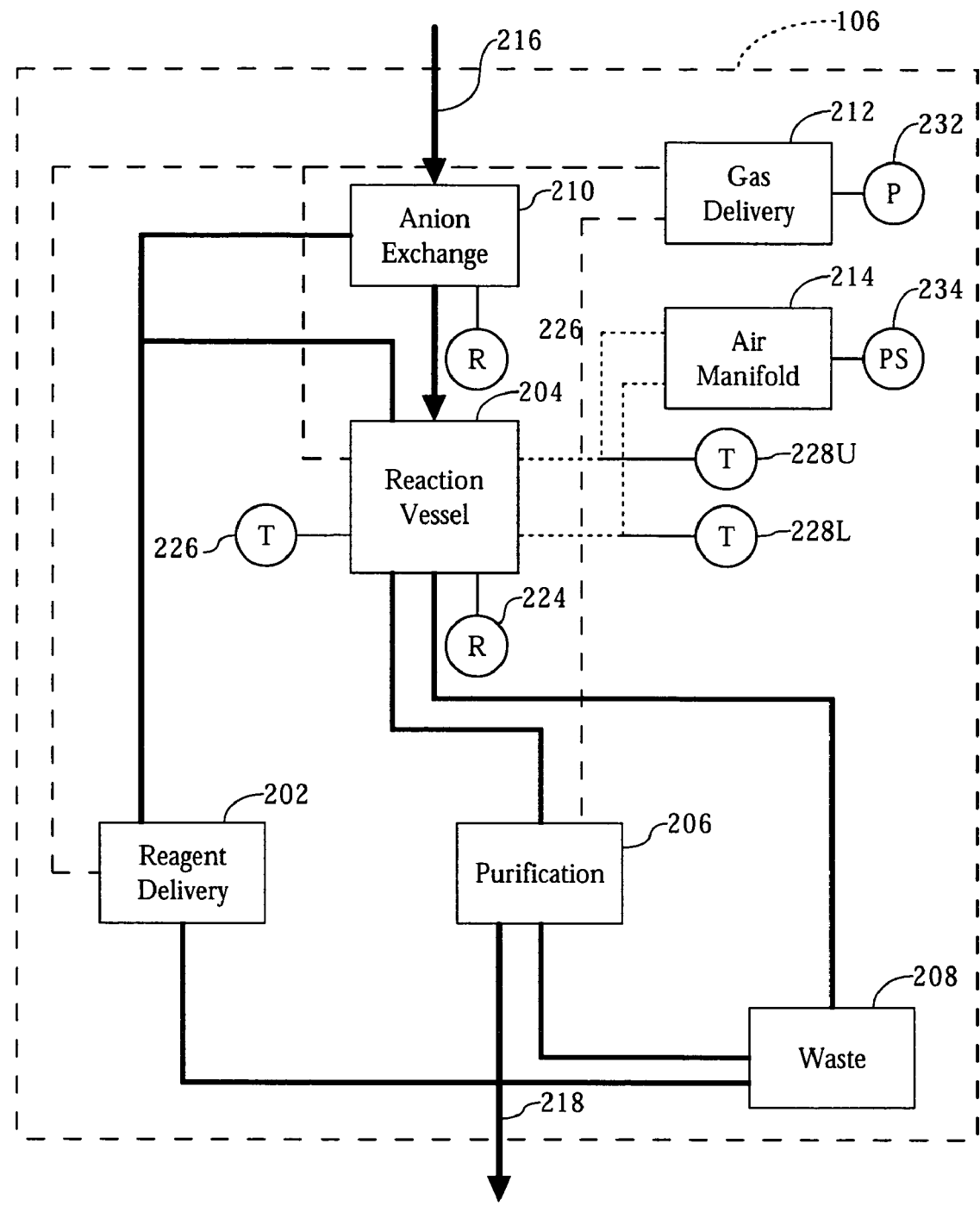
FIG. 2 is a block diagram of one embodiment of a controlled process.
Figure 3:
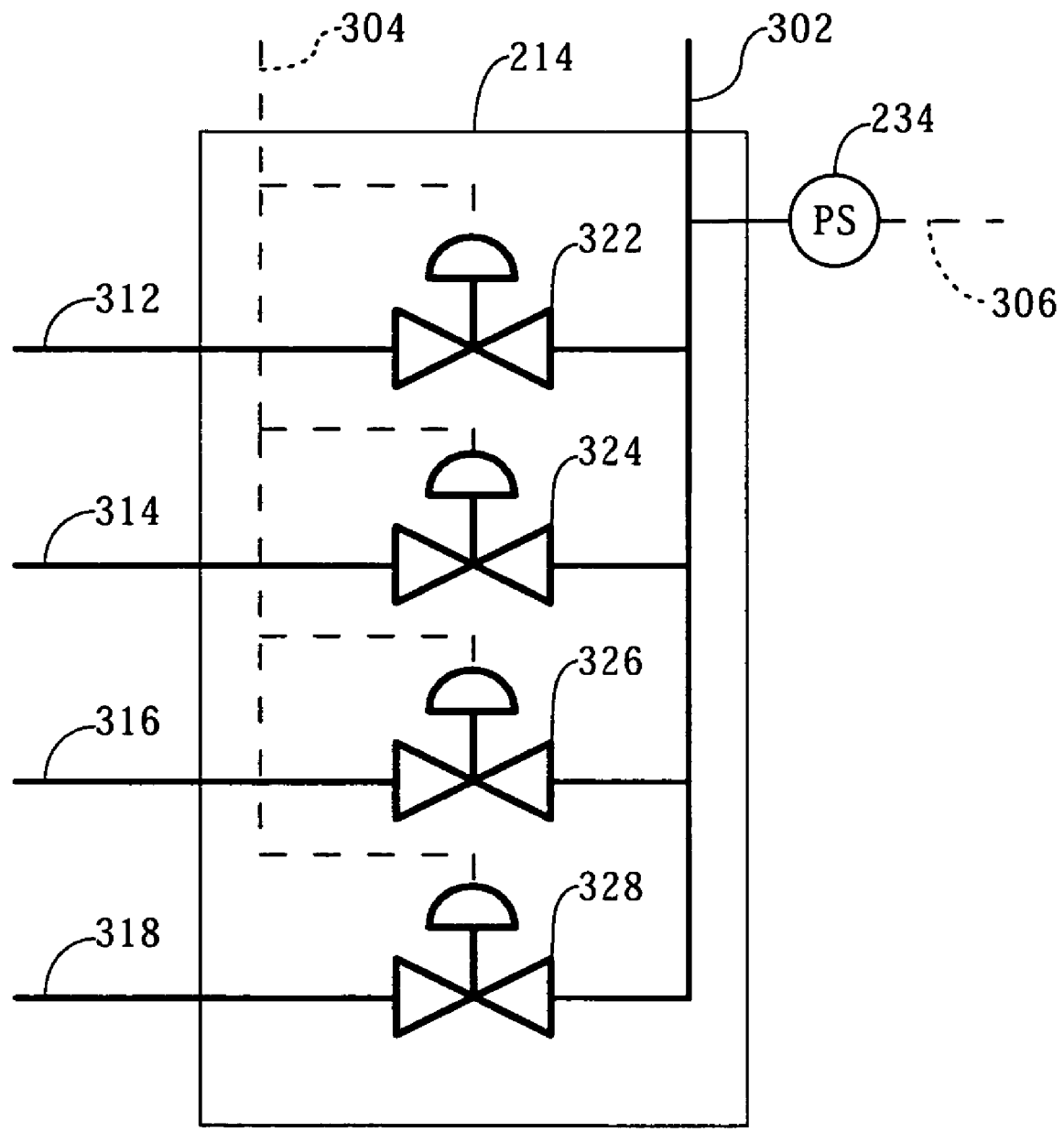
FIG. 3 is a piping and instrumentation diagram of one embodiment of an air manifold.

In one embodiment, the workstation 102 communicates with the controller 104 via a network connection 108, such as a local area network connection (LAN). In other embodiments, the workstation 102 communicates with the controller 104 via a wide area network connection (WAN) 108 or a direct hardwired connection 108. The workstation 102 provides a means for an operator, who may be a chemist or other skilled person, to build and/or maintain recipes and to interact with the controller 104. The controller 104 includes a processor that interfaces with the process hardware 106 to manipulate, or control and monitor, the status of the hardware. The process hardware 106 includes all the hardware necessary to perform the process flow. For example, the process hardware, in one embodiment, includes valves, pumps, reactors, piping, and instrumentation. FIGS. 2 and 3 illustrate one embodiment of process hardware 106, namely, the hardware used to synthesis radiopharmaceuticals.

The workstation 102 runs software providing a graphical user interface (GUI) 110 and manages the inputs and outputs (I/O) 120 between the workstation 102 and the controller 104. The GUI 110 includes software that provides an instrument view 112, tracing and/or logging 114, recipe editing 116, and operations 118.

Figure 5:
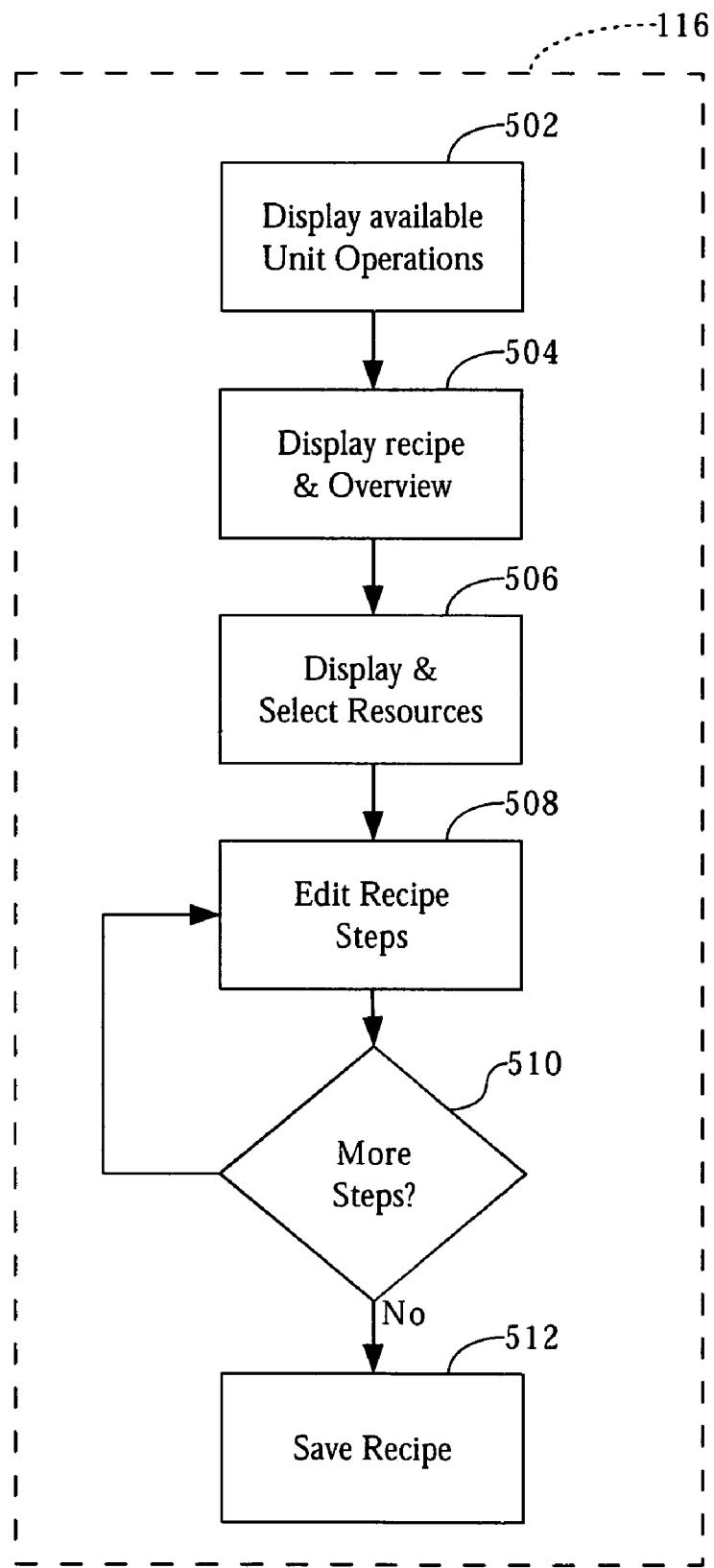
FIG. 5 is a flow diagram of one embodiment of the recipe editing routine.
Figure 6:
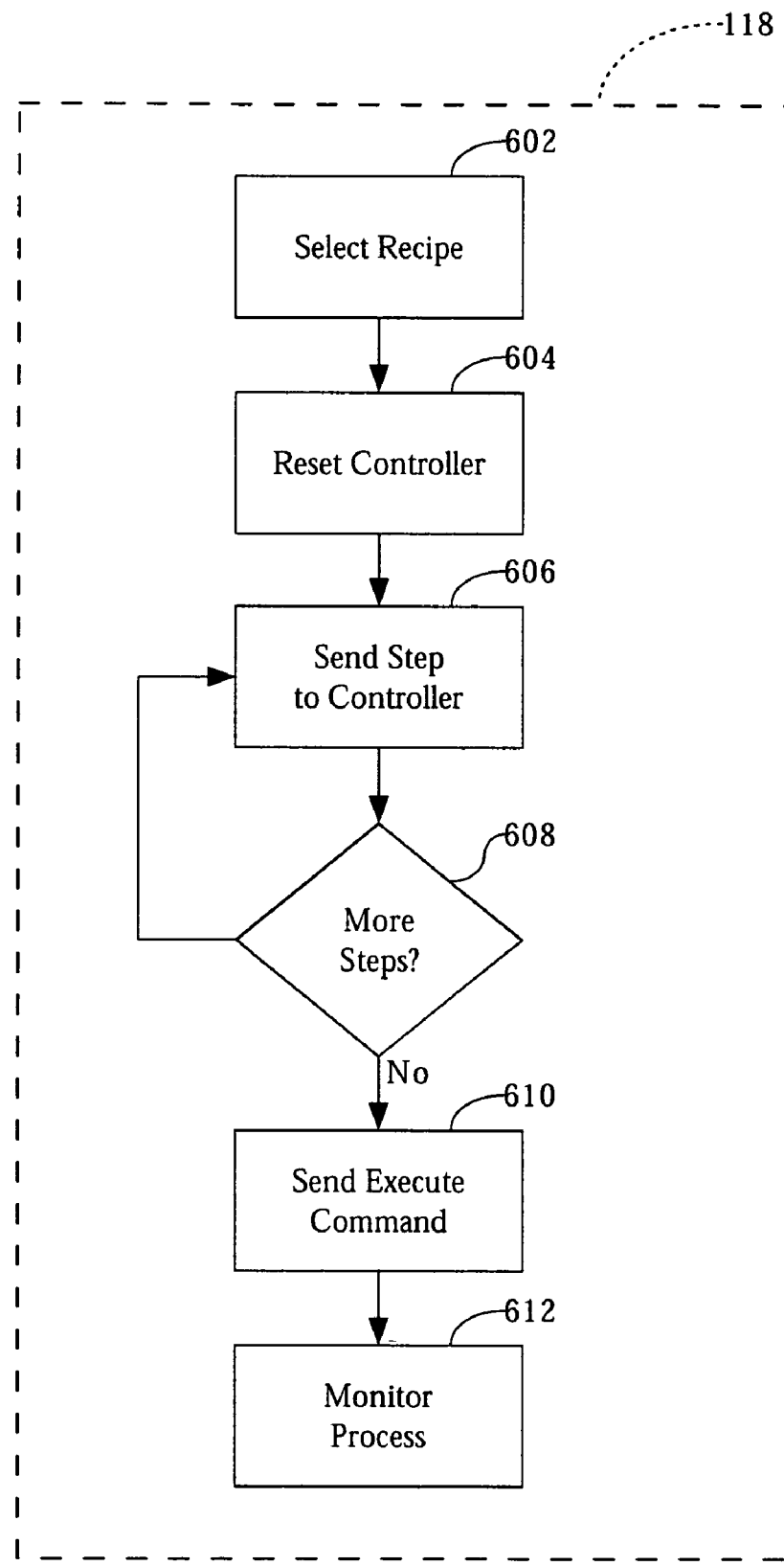
FIG. 6 is a flow diagram of one embodiment of the operations routine.

The instrument view 112 is a portion of the GUI 110 that provides information to the operator on parameters of the process flow. The information, in one embodiment, includes direct indication of instrumentation monitoring the process flow, for example, pressure and temperature sensors, valve position indicators, and current flow. In another embodiment, the information includes calculated parameters, for example, fluid flow based on pressure drop. The tracing and/logging 114 feature of the GUI 110 allows the progress of the process flow to be viewed and logged for future retrieval. In one embodiment, the tracing/logging routine 114 displays charts of the progress of the process flow. The recipe editor 116 portion of the GUI 110 allows the management or editing of the recipe. FIG. 5 includes a flow diagram of one embodiment of creating a recipe with the recipe editor routine 116. The operations 118 portion of the GUI 110 allows the operator to perform the operations necessary to control the process flow in accordance with the recipe. In one embodiment, the operations routine 118 includes controls to start and stop the recipe to perform the process flow. FIG. 6 includes a flow diagram of one embodiment of the operations routine 118.

In one embodiment, the controller 104 includes hardware and software that provide workstation input and output control (I/O) 132 and process hardware input and output control (I/O) 138. The controller 104 also includes hardware and software for a process control 134 and a hardware control 136. In one embodiment, the process control 134 and the hardware control 136 are modules or software programs the perform distinct functions.

The workstation I/O 132 provides for communications between the workstation 102 and controller 104. The process hardware I/O 138 provides for communications between the controller 104 and the process hardware 106. The workstation I/O 132 and process hardware I/O 138, in one embodiment, are implemented independently via hardware and software. In another embodiment, the hardware associated with the workstation I/O 132 and process hardware I/O 138 are combined such that the hardware communicates with all devices 102, 106. The process control 134 provides an interface between the recipe created and stored on the workstation 102 and the hardware control 136, which provides control and monitoring of the process hardware 106. In various embodiments, the process hardware I/O 138 includes digital I/O, analog I/O, and serial control signals to the process hardware 106.

In one embodiment, the workstation 102 and the controller 104 form a client-server relationship. Although FIG. 1 illustrates the workstation 102 communicating directly with the controller 104, in another embodiment, a plurality of workstations, or clients, 102 are connected to the network 108 and communicate with the controller 104 via the network 108. In this embodiment, either one of the workstations 102 or the controller 104 functions as a server by storing the data used by the other computers 102, 104. In another embodiment, a separate server (not illustrated) stores the recipes and other data, which is retrieved by the workstation 102. In this embodiment, the workstations 102 and the controller 104 are clients.

As used herein, a "client" should be broadly construed to mean any computer or component thereof directly or indirectly connected or connectable in any known or later-developed manner to a computer network, such as the Internet or a local area network. Examples of a client include, but are not limited to, a personal computer, a terminal that communicates over the Internet, and an Internet connected television. The client runs, or executes, software that communicates with the server. The term "server" should also be broadly construed to mean a computer, computer platform, an adjunct to a computer or platform, or any component thereof that provides data or information to a client. The server runs, or executes, software that allows it to properly handle and process client requests, in addition to other processes necessary for the server to perform its required functions. Of course, a client should be broadly construed to mean the equipment that requests or gets a file or information, and a server is the equipment that provides the file or information. These terms are based on the function of the associated equipment and the terms may interchange as the function of a particular piece of equipment changes.

As used herein, the processors contained in the workstation 102 and the controller 104 should be broadly construed to mean any computer or component thereof that executes software. Each of the workstation 102 and the controller 104 includes a memory medium that stores software, a processing unit that executes the software, and input/output (I/O) units for communicating with external devices. Those skilled in the art will recognize that the memory medium associated with each of the workstation 102 and the controller 104 can be either internal or external to the processing unit of the processor without departing from the scope and spirit of the present invention.

The workstation 102 and the controller 104 should be broadly construed to mean any computer or component thereof that executes software. In one embodiment the workstation 102 and the controller 104 are general purpose computers, in another embodiment, they are specialized devices for implementing the functions of the invention. Those skilled in the art will recognize that each of the workstation 102 and the controller 104 includes an input component, an output component, a storage component, and a processing component. The workstation 102 has an input component that receives input from external devices, such as the operator via a keyboard and mouse, and the controller 104. The controller 104 has at least one input component that receives input from external devices, such as the workstation 102 and the process hardware 106. The workstation 102 has an output component that sends output to external devices, such as a video display, a printer, and/or the controller 104. The controller 104 has an output component that sends output to external devices, such as the workstation 102 and the process hardware 106. Both the workstation 102 and the controller 104 include a storage component that stores data and program code. In one embodiment, the storage component includes random access memory. In another embodiment, the storage component includes non-volatile memory, such as floppy disks, hard disks, and writeable optical disks. The processing component executes the instructions included in the software and routines.

In one embodiment, the controller 102 is a PC 104 based system that includes a processor, I/O, and storage. In this embodiment, the workstation I/O 132 and the process hardware I/O 138 are contained within the PC 104 based system, which includes a processor and associated plug-in modules or cards. In one embodiment, the process control 134, and the hardware control 136 are implemented by software routines executed on a single CPU on the PC 104 based system.

In one embodiment, each of the functions identified herein are performed by one or more software programs, routines, or methods, run by at least one processor. In another embodiment, one or more of the functions identified are performed by hardware and the remainder of the functions are performed by one or more software programs, routines, or methods, run by at least one processor. In still another embodiment, the functions are implemented with hardware, with at least one processor providing routing and control of the entire integrated system 10.

The processors execute software programs, routines, or methods, for performing various functions. These programs, routines, or methods, can be discrete units of code or interrelated among themselves. Those skilled in the art will recognize that the various functions can be implemented as individual programs, routines, code snippets, or methods associated with objects, or in various groupings without departing from the spirit and scope of the present invention. As used herein, software, programs, routines, and methods are synonymous. However, in general, a routine refers to code that performs a specified function and a method refers to code associated with an object, whereas software and program are more general terms that may include more than one routine or method or perform more than one function. Those skilled in the art will recognize that it is possible to program a general-purpose computer or a specialized device to implement the invention.

FIG. 2 illustrates one embodiment of process hardware 106, namely, the hardware used to synthesis radiopharmaceuticals. FIG. 2 illustrates a simplified system diagram for synthesizing radiopharmaceuticals and shows the major sub-systems as functional blocks and selected instrumentation associated with those functional blocks. The diagram of FIG. 2 is not intended to be complete or describe a functional system, but is presented solely for illustration of one embodiment of the process hardware 106.

The input to the process is an activated fluid routed through tubing 216 from the target to anion exchange subsystem 210 on to the reaction vessel subsystem 204. The reagent delivery subsystem 202 dispenses the reagents and solutions from five, septum-sealed, glass vial reagent vessels. The reagent delivery subsystem 202 routes the reagents to the reaction vessel subsystem 204, the anion exchange subsystem 210, and the waste subsystem 208. The gas delivery subsystem 212 is connected to the reaction vessel subsystem 204, the reagent delivery subsystem 202, and the purification subsystem 206. The gas delivery subsystem 212 is used to push the reagents through portions of the system and for purging. A pressure sensor 232 monitors the gas pressure at the gas delivery subsystem 212. The air manifold 214 routes air to the reaction vessel subsystem 204 for heating and cooling the upper and lower chambers. A pressure switch 234 monitors the air pressure at the air manifold 214. Temperature sensors 228U, 228L monitor the temperature of the air supply at the reaction vessel upper and lower chambers, respectively, and provide heater control for the chambers. The reaction vessel subsystem 204 has a temperature sensor 226 monitoring the temperature inside the reaction vessel. The reaction vessel subsystem 204 also has a radiation sensor 224 monitoring the radiation levels in the reaction vessel. The anion exchange subsystem 210 has a radiation sensor 226 monitoring the radiation levels in the subsystem 206. The output of the process is discharged from the purification subsystem 206 through line 218.

FIG. 3 illustrates the piping and instrumentation for the air manifold 214. Air is supplied to the manifold through line 302. A series of solenoid valves 322, 324, 326, 328 control the release of air to the four outlet lines 312, 314, 316, 318. A pressure switch 234 monitors the air supply line 302 and has an electrical connection 306 to the controller 104. The solenoids associated with the valves 322, 324, 326, 328 have an electrical connection 304 to the controller 104. Through these electrical connections 304, 306, the controller 104 operates and monitors the air manifold 214.

In the process hardware 106 illustrated in FIG. 2, two outlet lines 312, 314 provide air flow to the upper reaction vessel chamber and the other outlet lines 316, 318 provide air flow to the lower reaction vessel chamber. The heaters for the upper and lower reaction vessel chambers must not be energized unless the air supply to the reaction vessel chamber is available and above a specified pressure.

For example, the evaporate unit operation includes opening the valves 322, 324, 326, 328 supplying air to the reaction vessel subsystem 204 if the pressure switch 234 indicates a minimum pressure at the air manifold 218, controlling the upper and lower reaction vessel chamber temperatures by switching the chamber heaters, monitoring a duration timer for the operation, operating the purge valves and other associated hardware. The operator does not need to be concerned with the specific hardware operations required to perform the evaporation unit operation. The operator does control the chamber temperatures and the duration of the evaporation operation, independent of the hardware.

Figure 4:
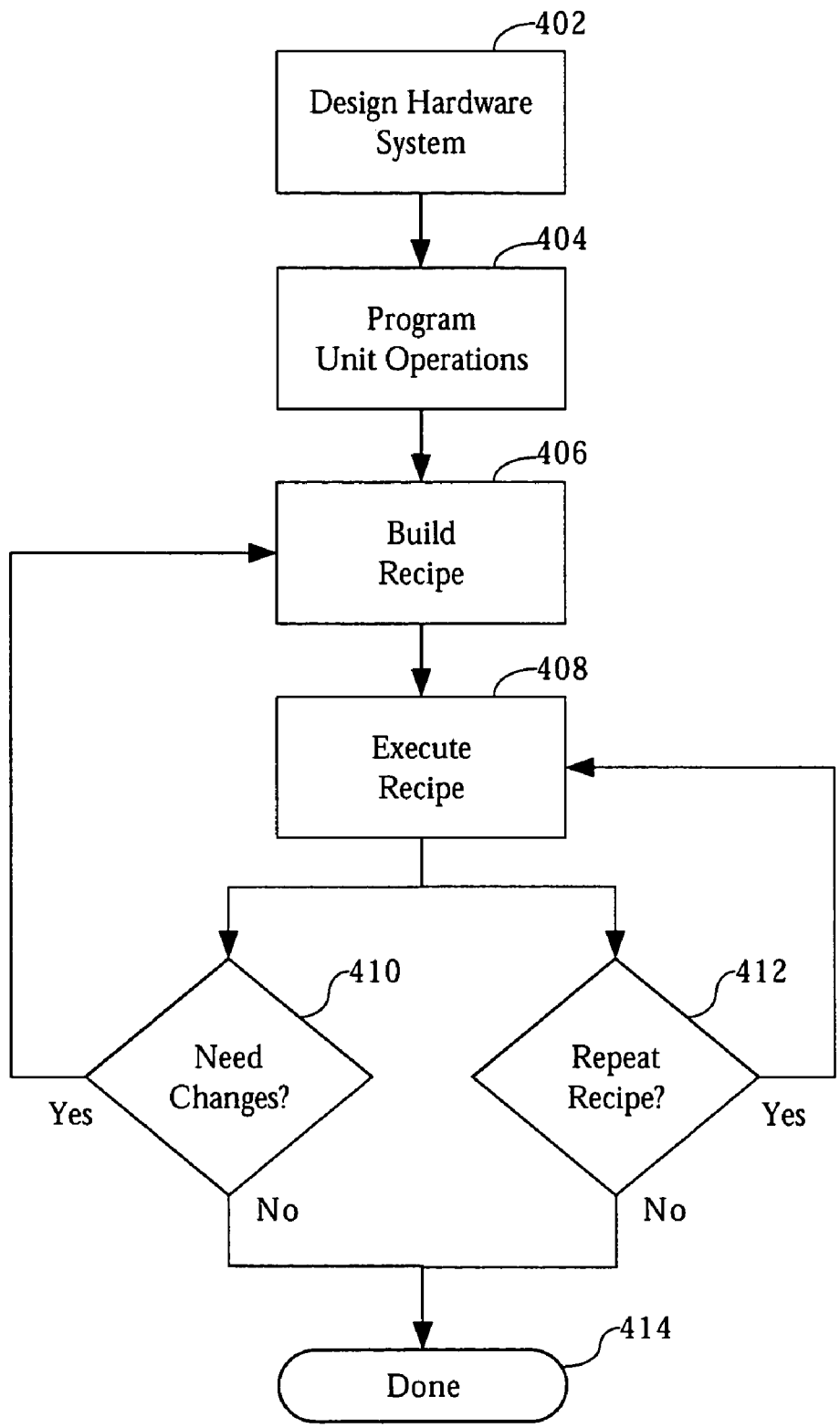
FIG. 4 is a flow diagram of one embodiment of the steps for the process control system.

FIG. 4 illustrates the steps in developing and using the process control system 10. Initially, the process hardware 106 is designed 402. The design step 402 involves considering the process flow to be performed and the various required functions and unit operations. In conjunction with designing the hardware system 402 is the step of programming the unit operations 404. The illustrated embodiment shows the two steps for designing 402 and programming 404 as being sequential steps. In another embodiment, the steps 402, 404 are performed in parallel. A programmer familiar with the process hardware 106 and the controller 102 programs each unit operation such that the unit operation controls the required process hardware 106 and allows the operator to specify process variables of concern. The operator is not required to have any explicit knowledge relating to the process hardware 106 required by that unit operation. For example, the necessary hardware for the unit operation for evaporation includes the reaction vessel, the air manifold valves 322, 324, 326, 328, the air manifold 218 pressure switch 234, the reaction vessel subsystem 204 temperature sensors 226, 228, and other associated hardware. After identifying the appropriate hardware, the programmer creates the program steps that the controller 104 requires for operating the process hardware 106 to perform the unit operation.

After the unit operations are programmed 404, the process control system 10 is ready for an operator, who in one embodiment is a chemist, to build a recipe 406. The operator builds the recipe 406 with the recipe editor 116 software running at the workstation 102. After at least one recipe is built 406, the operator executes the recipe 408, which causes the controller 104 and the process hardware 106 to perform the process flow defined by the recipe. The execute recipe step 408 includes the operator initiating execution with the operations 118 software running at the workstation 102 and the controller 104 controlling and monitoring the process hardware 106. After execution of the recipe 408, if the operator decides that changes are needed 410, the operator returns to the build recipe step 406. Also, if the operator decides to repeat the recipe 412, the operator repeats the execute recipe step 408. Otherwise, the process is done, or finished, 614.

In one embodiment, the unit operations mimic the operations the chemist would take if the process were being manually performed in a lab environment. For example, the chemist is not concerned which of several reaction vessels is being used for evaporation, the chemist is concerned with the reaction vessel containing his solution, the temperature evaporation is to occur at, and the duration of the evaporation.

In the example discussed above where the process flow is the synthesis of a radiopharmaceutical, one example of a recipe for synthesizing a radiopharmaceutical, such as FDG, starts with the following unit operations:

1. Trap
2. Prime pump
3. Start synthesis timer
4. Pump add reagent trap
5. Bubble on
6. Reaction vessel purge start
7. Evaporate
8. Reaction vessel purge stop
9. Bubble off Each of the above exemplary unit operations have meaning to the chemist. In another embodiment, unit operations 5 through 9 above are included in a single unit operation of "evaporate with bubble." The evaporate with bubble unit operation describes the chemical process to be conducted and is specified by the operator in the recipe. The programmer develops the code that translates that unit operation into operations understood by the controller 102.

FIG. 5 illustrates a flow diagram of one embodiment for creating a recipe with the recipe editor routine 116. In one embodiment, the operator is presented with a GUI 110 with three data display portions. In one display portion, the available unit operations are displayed 502. These unit operations include those that have been predefined to the process hardware 106. A second and third display portions display the recipe and provide an overview of the recipe 504. In this GUI 110, resources are displayed for selection 506 by the operator. To create or edit a recipe 508, the operator selects displayed unit operations and positions them in the second display portion in a desired order. The operator repeats these steps 510 until the recipe is completed, at which time the operator saves the recipe 512.

In one embodiment, the recipe editor 116 has a user interface in which the user is presented with a list of available unit operations 502, the user is presented with a recipe list 504 showing the unit operations the user has selected for the recipe, and the user is presented with a resource list 506. The user has the option to edit the recipe 508, 510 by adding and deleting available unit operations from the recipe list 504. The user also has the option to edit the resources associated with the recipe.

FIG. 6 illustrates a flow diagram of one embodiment of the operations routine 118. In one embodiment, the operator is presented with a GUI 110 that allows the operator to select a desired recipe 602 for execution. After the operator selects the recipe 602, the workstation 102 communicates with the controller 104 to reset the controller 604. In one embodiment, the workstation 102 then sends the individual recipe unit operations 506 to the controller 104. The workstation repeats this operation 608 until all the unit operations are sent 606. In another embodiment, the workstation 102 converts the unit operations to steps that the controller 104 recognizes for controlling the process hardware 106. After conversion, the workstation 102 sends the steps 606 to the controller 104 until there are no more steps to send 608.

After all the unit operations or steps are sent to the controller 104, the workstation 102 sends the controller 104 an execute command 510. The controller 104 begins execution of the recipe and communicates with the workstation 102 to monitor the process 612. In the illustrated embodiment, after the controller 104 receives the execute command 610, communications between the workstation 102 and the controller 104 are not necessary in order for the controller 104 to perform the process flow in accordance with the recipe.

Figure 7:
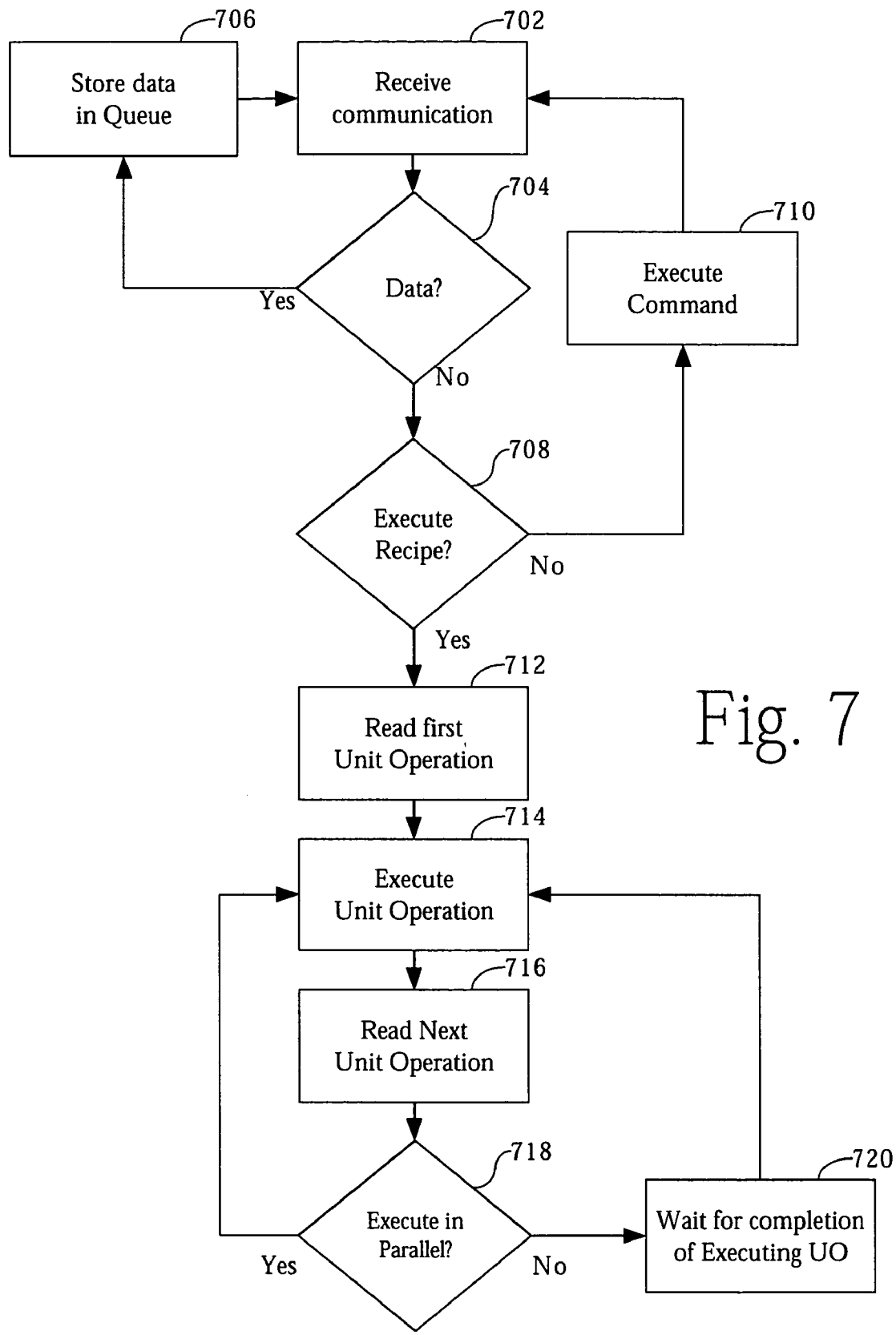
FIG. 7 is a flow diagram of one embodiment of the steps for the process control.

FIG. 7 illustrates a flow diagram of one embodiment of the steps performed as part of the process control 134 in the controller 104. The steps begin with monitoring the workstation I/O 132 to receive communications 702 from the workstation 102. Information received from the workstation 102 is evaluated as to whether it is data 704. Data in this case being unit operations sent to the controller 606. If data was received from the workstation 102, the data is stored 706 in the controller 104 for later use. In one embodiment, the data is stored in a queue 706 for later removal during a read step 712, 716. If the received information is not a unit operation, it is examined to determine if the communication is a command to execute the recipe 708 sent by the workstation 102 as the send execute command step 610. If the communication is not an execute command, the communication is examined to determine if it is another command, which is then executed 710. For example, in one embodiment, the workstation 102 sends a reset command 604.

After the full recipe is transferred and stored 702, 704, 706, the controller 104 executes the recipe after receiving the execute command 708. The controller 104 reads the first unit operation of the recipe 712. This first unit operation is executed 714. The next unit operation in the recipe is read 716 from storage. The next unit operation is evaluated to determine if it can be executed in parallel 718 with the currently executing unit operation. If the next unit operation can be executed in parallel 718, then that next unit operation is executed 714 and the next unit operation after that one is read 716 and evaluated as to whether it can be executed in parallel 718. This process loops until a unit operation is read 716 that cannot be executed in parallel 718, at which time the process waits for completion of all executing unit operations 720 before executing the last read unit operation 714, which is the unit operation that cannot be executed in parallel. The unit operations are read 716 and executed 714 until all the unit operations in the recipe have been executed, at which time the process flow is complete.

The test for whether the unit operations are to executed in parallel 718 is based on whether the unit operation is mechanically possible to be performed in parallel with the previous unit operation. In another embodiment, the test is based on whether the unit operation is chemically possible to be performed in parallel with the previous unit operation.

The programmer, when programming the unit operations 404, determines the relationships between the unit operations and the conditions that must exist before the unit operation can be executed. In one embodiment, a matrix identifies the unit operations and which other unit operations can be performed in parallel with it. Such a matrix considers the hardware requirements for each unit operation and requires unit operations that require the same hardware to run sequentially. For those unit operations that do not require the same hardware, the unit operations are permitted to be executed in parallel if the operator places the unit operations together in the recipe.

In another embodiment, the first unit operation is read 712 and executed 714. This first unit operation starts a parallel group, that is, a group of unit operations that can be executed in parallel. The next unit operation is read 716 and classified as either a parallel unit operation or a sequential unit operation 718. Parallel unit operations are executed 714 and added to the parallel group. As long as the next unit operation is not a sequential unit operation, the next unit operation is read 716 and classified 718. If the next unit operation is a sequential unit operation 718, the process control 134 waits for all of the parallel unit operations in the parallel group to complete execution 720. The sequential unit operation is then executed 714 and starts a new parallel group. The loop of reading the next unit operation 716 and classifying it 718 is repeated.

Execution of a unit operation 714 involves running a routine in the controller 104 to perform specific steps as determined by the programmer, based on the process hardware 106. In other words, the programmer develops a software routine written specifically to control and monitor the process hardware 106 required for execution of the unit operation. In one embodiment, classes describe different types of hardware at different levels of abstraction, and each piece of hardware corresponds to an object instantiated from a class. The various parameters and characteristics of each piece of hardware are defined as properties of the object instantiated for that piece of hardware. See FIG. 15 for illustration of the classes for the process control 134, which describe the hardware at an abstract level. See FIG. 16 for illustration of the classes for the hardware control 136, which describe the hardware at a component, or low, level.

Figure 8:
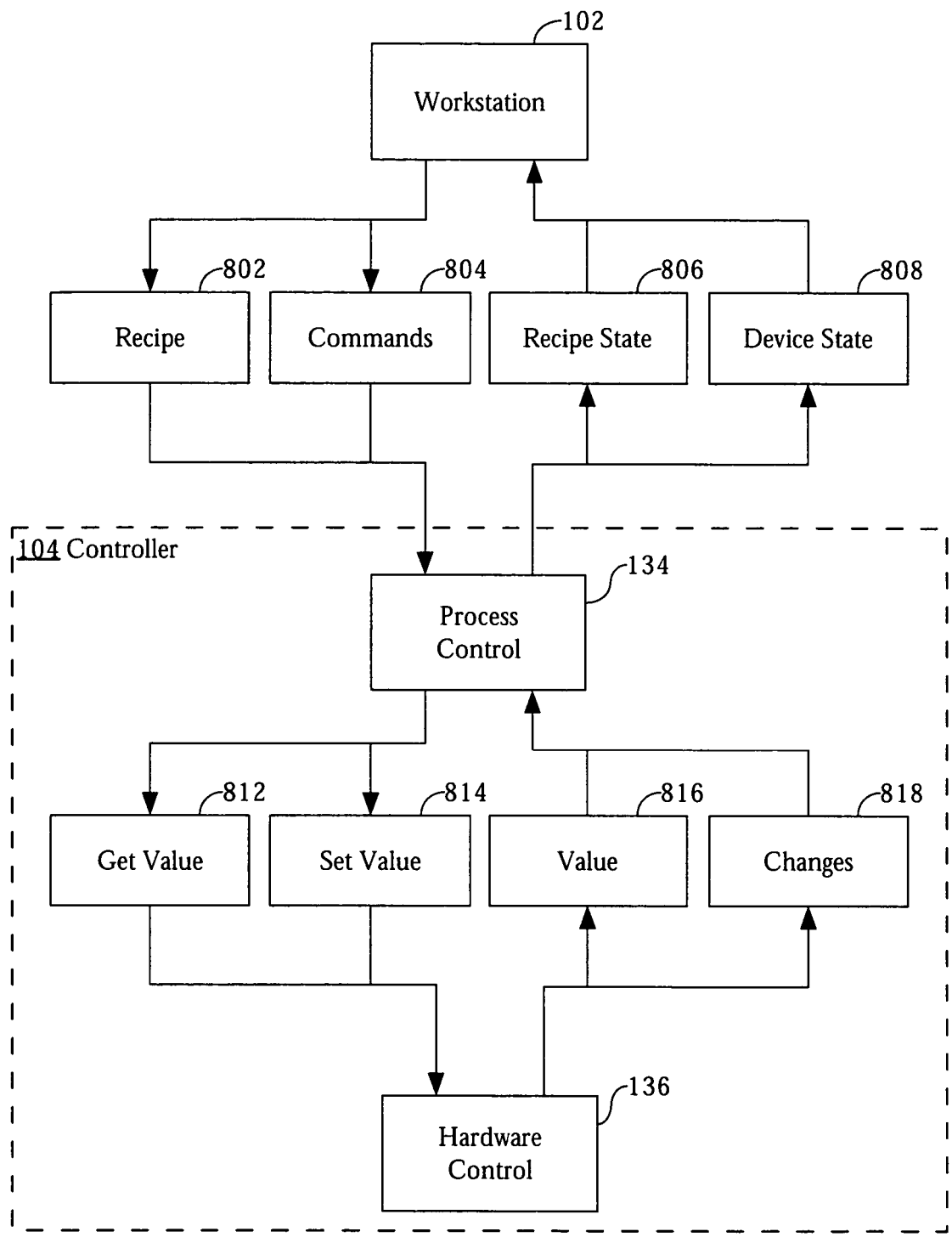
FIG. 8 is a diagram illustrating one embodiment of the communications between the workstation and the controller.

FIG. 8 illustrates a diagram of one embodiment of the interface communications between the workstation 102 and the controller 104. Software routines running on the workstation 102 and the controller 104 communicate with each other, passing requests and data. The interface between the workstation 102 and the controller 104 controls these communications. The controller 104 has at least two sets of software routines running, one for process control 134 and another for hardware control 136. The process control 134 and the hardware control 136 software routines communicate with each other, passing requests and data, each executing methods and routines in the other.

The workstation 102 sends the recipe 802, including all the unit operations and parameters, to the process control 134. The workstation 102 also sends commands 804, such as reset and execute, to the process control 134. The workstation 102 receives the recipe state 806 and device states 808 from the process control 134. The recipe state data 806 includes, in various embodiments, information with respect to the state of the recipe and the individual unit operations of the recipe, along with start and finish times. FIG. 8 does not show the workstation I/O 132 in the controller 104 because this figure illustrates the information flow between the various components, not the actual electrical signals carrying that information.

Various information is passed between the process control 134 and the hardware control 136 in the controller 104. In one embodiment, the process control 134 addresses the requirements of the recipe at a device level, and the hardware control 136 addresses the requirements of the individual pieces of hardware making up the process hardware 106. The process control 134 sends requests to get a value 812 and to set a value 814 to the hardware control 136. The process control 134 receives information relating to hardware values 816 and changes to values 818 from the hardware control 136.

Figure 9:
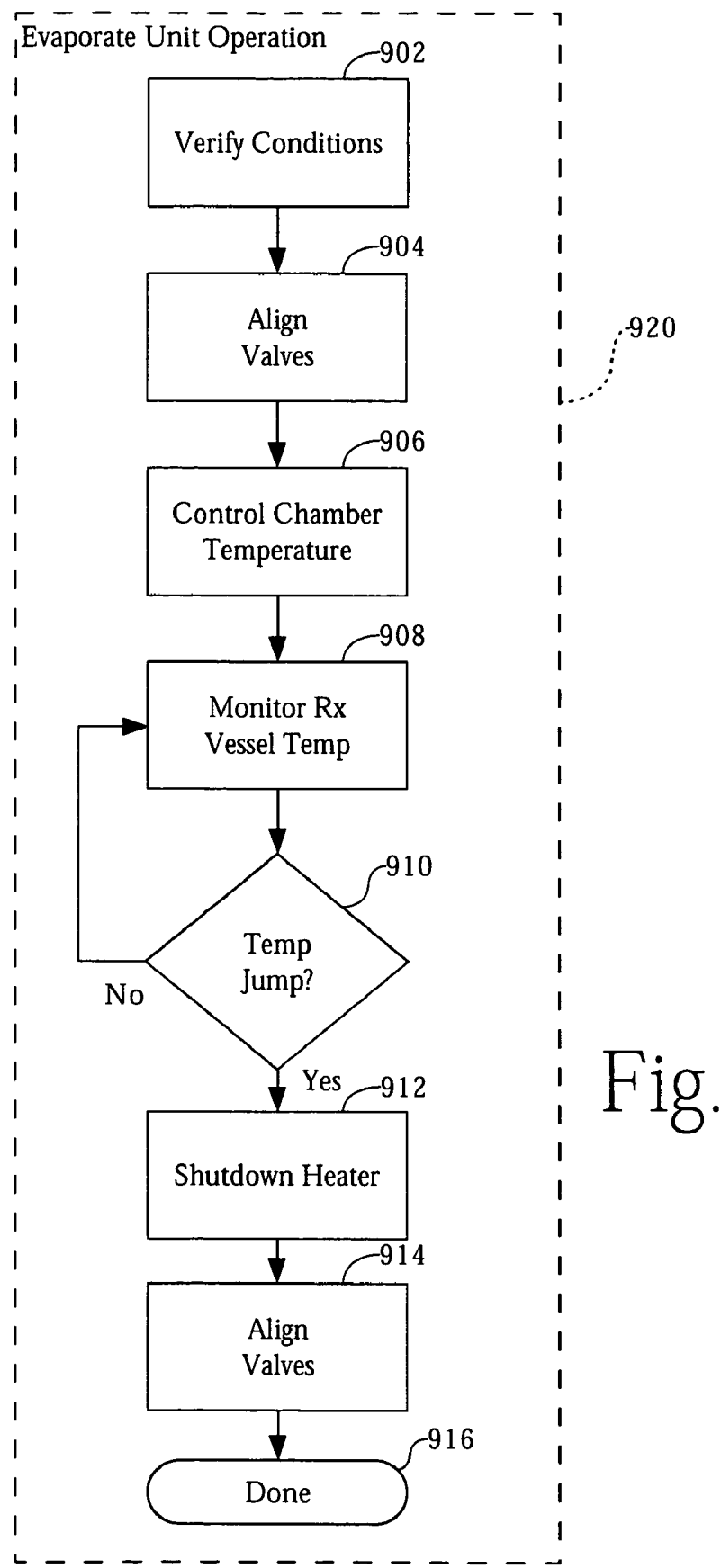
FIG. 9 is a flow diagram of one embodiment of the steps for an evaporate unit operation.

FIG. 9 illustrates a flow diagram of one embodiment of the steps performed as part of the evaporate unit operation 920. The steps illustrated in FIG. 9 are shown as an example and are not intended to show all the steps required for evaporate unit operation 920.

Using the evaporate unit operation 920 as an example, the first step is to verify the conditions 902 before proceeding with the other steps. The conditions to verify 902 includes verifying that power is available and that the air pressure 902 is above a minimum pressure at the air manifold 214 by checking the pressure switch 234. If the conditions are adequate, the next step is to align the valves 904 at the air manifold 214 to deliver air to the upper and lower chambers of the reaction vessel subsystem 204 for heating the reaction vessel. The next step is to control the upper and lower chamber temperatures 906. In one embodiment, the process hardware 106 includes a temperature controller that monitors and controls a temperature. In this embodiment, the software must only send the temperature setpoint and initiate control by the temperature controller.

After the control of the chamber temperatures 906 is initiated, the reaction vessel temperature is monitored 908. In one embodiment, an infrared temperature sensor 226 monitors the temperature of the reaction vessel. During evaporation, the reaction vessel temperature is relatively constant due to heat transfer from the chamber heaters to the fluid inside the reaction vessel and the fluid boiling. Once the fluid boiling stops, the temperature of the reaction vessel has a step increase from a temperature just above the boiling temperature of the fluid to the temperature of the heating chamber. As long as there is no temperature jump 910, the heating continues, as does the monitoring of the reaction vessel temperature 908. When the temperature jumps 910, the chamber heaters are shutdown 912, and the air manifold valves are aligned 914 to shut down the air flow to the reaction vessel subsystem 204. After the system is restored, the evaporation unit operation is done 916.

Figure 13:
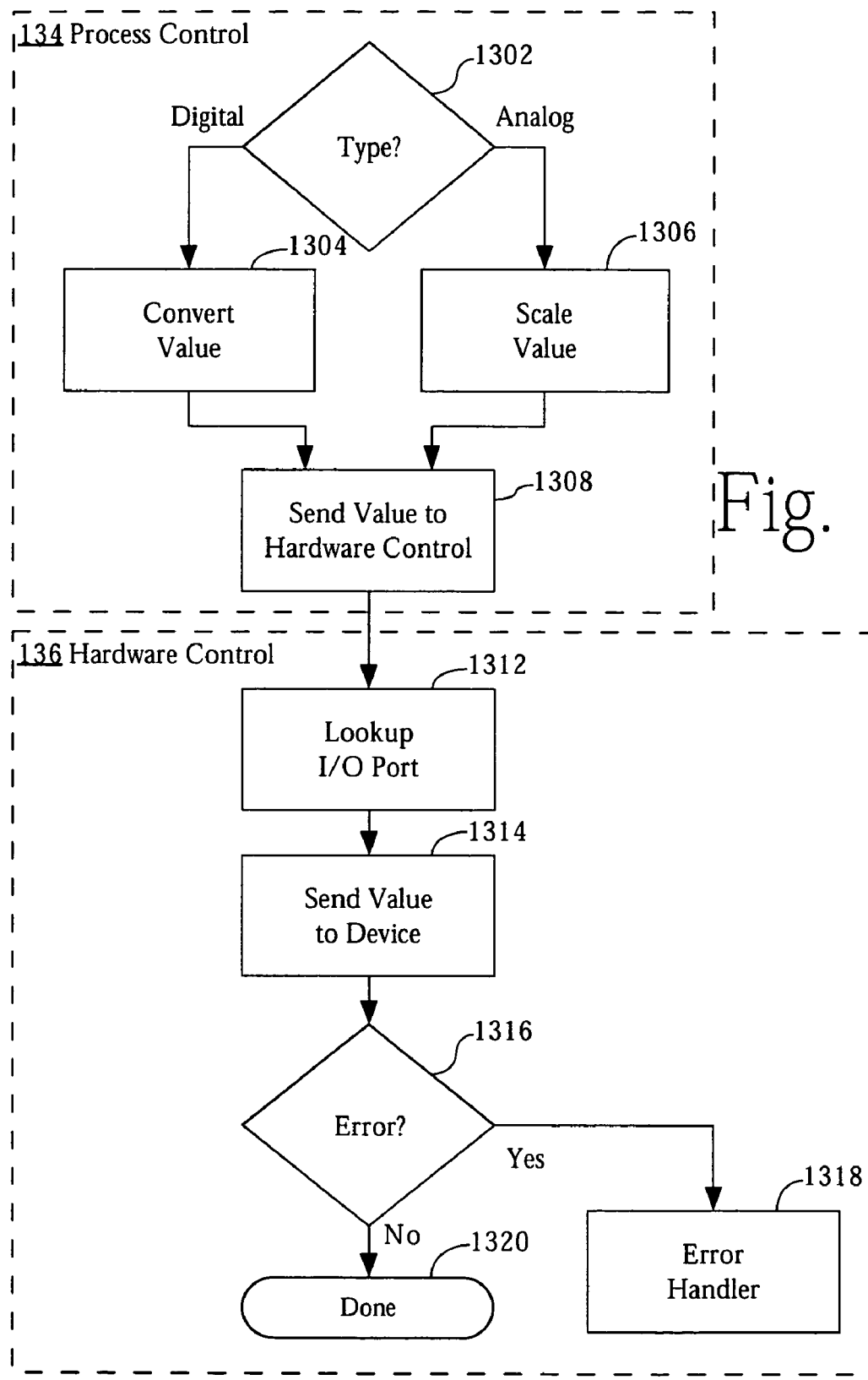
FIG. 13 is a flow diagram of one embodiment of the steps performed when sending information to the process hardware.

FIG. 10 illustrates a partial flow diagram of one embodiment of the sub-steps performed as part of the evaporate unit operation 920. As seen in FIG. 9, the evaporate unit operation 920 includes steps to control the chamber temperature 906 and to monitor the reaction vessel temperature 908. The step to control the chamber temperature 906 includes the sub-step to set the temperature 1002 of the temperature controller device. In order to set the temperature 1002, a routine in the process control 1004 executes a process control out method 1004 that sends the controlled temperature value to the hardware control 136. A routine in the hardware control 136 executes a hardware control out method 1006 that sends the controlled temperature value to the specific piece of process hardware 106 that controls the chamber temperature. FIG. 13 illustrates one embodiment for implementing these two methods in process control 134 and the hardware control 136.

Figure 11:
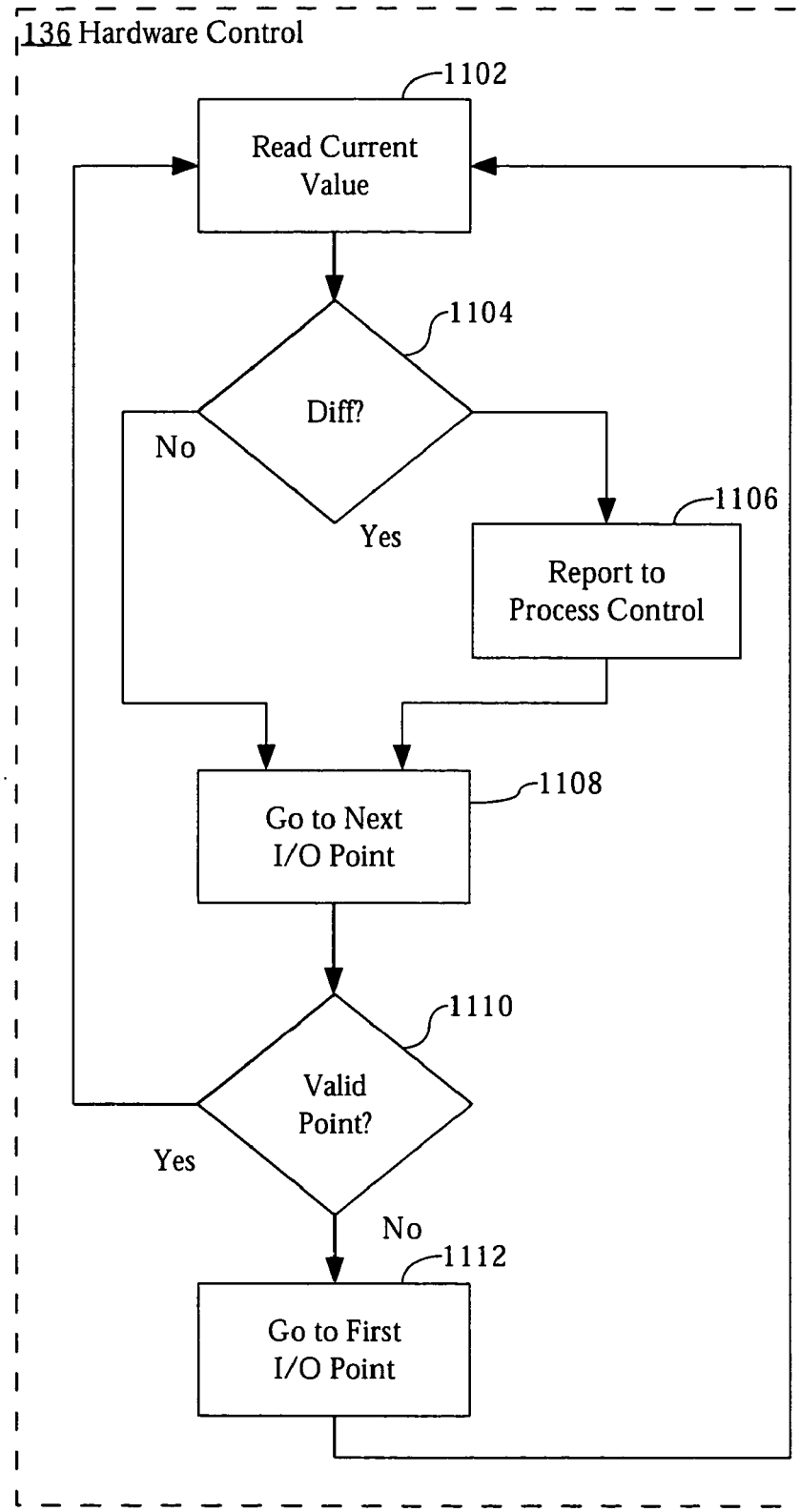
FIG. 11 is a flow diagram of one embodiment of the steps performed by the hardware control in reading hardware values.
Figure 12:
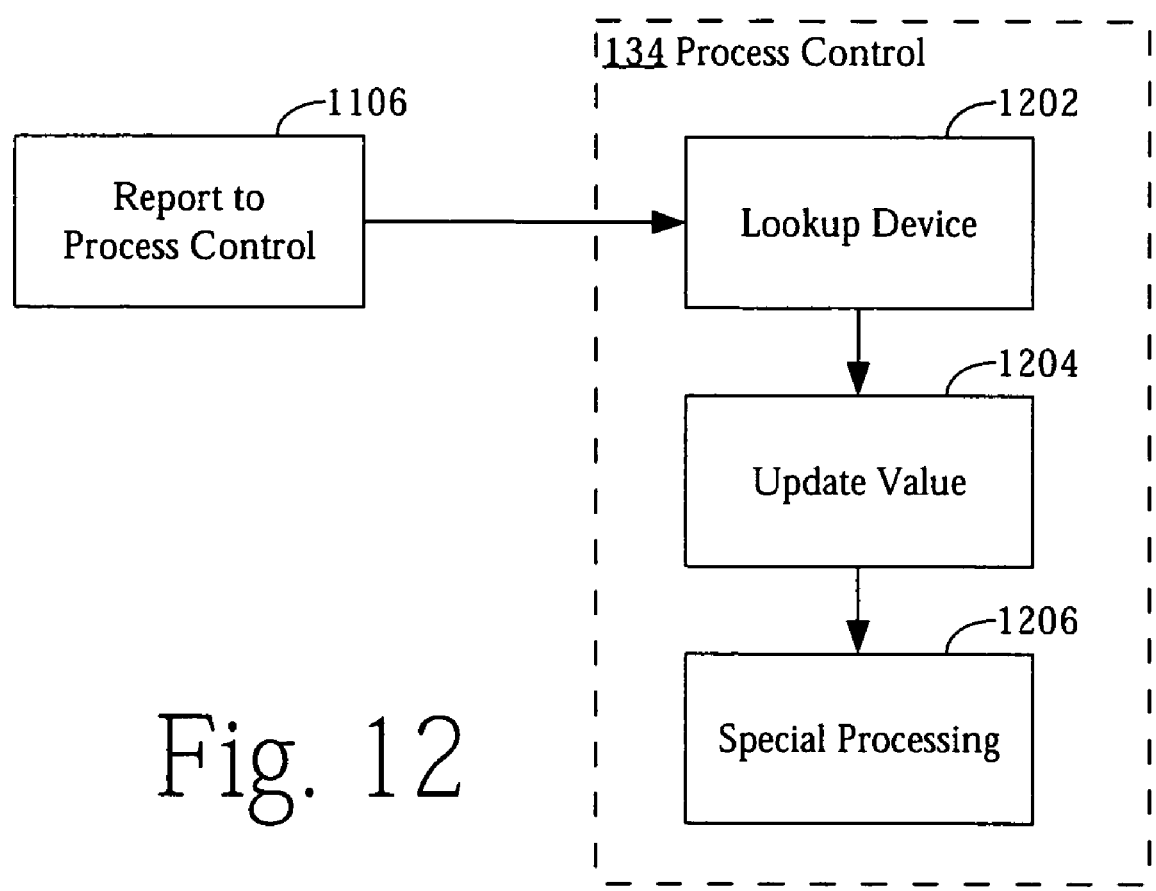
FIG. 12 is a flow diagram of one embodiment of the steps performed by the process control in reading hardware values.

The step to monitor the reaction vessel temperature 908 includes a sub-step to have the process control read 1012 the temperature value from the specific piece of process hardware 106 that monitors the reaction vessel temperature. The first sub-step is followed by the hardware control input method 1014, which is a routine that queries the specific piece of process hardware 106 that monitors the reaction vessel temperature. Lastly, a sub-step stores the temperature value 1016 for later evaluation by step 910. FIGS. 11 and 12 illustrate one embodiment for reading values of the process hardware 106.

FIG. 11 illustrates a flow diagram of one embodiment of the steps performed by the hardware control 136 in reading values of the process hardware 106. The hardware control 136 directly monitors and interacts with the process hardware 106. To accomplish this, the hardware control 136, in one embodiment, continuously monitors the process hardware 106 and reports any changes to the process control 134. The monitoring function is performed by periodically scanning all the I/O points, or ports, to which the process hardware 106 is connected and provides a value. Such process hardware 106 includes, but is not limited to, various sensors and instruments, such as temperature, pressure, and radiation sensors that provide analog outputs; switches that provide a digital indication of position; and valves that provide position indication.

The monitoring routine initially reads the current value of an I/O point 1102. The value read is compared to the previously read value to determine if there is a difference 1104. If there is a difference 1104, the new value is reported to the process control 1106. If there is no difference 1104 or if there was and the value was reported 1106, the next step is to go to the next I/O point 1108. In one embodiment, the current I/O point is stored as a numerical value which is incremented. The next I/O point is examined to ensure it is a valid point 1110, if it is, the routine loops to the first step of reading the current value 1102. If not, then the routine goes to the first I/O point 1112 and then loops to the first step of reading the current value 1102. In one embodiment, the monitor loop contains a time delay that ensures that every I/O point is read at a specific rate.

FIG. 12 illustrates a flow diagram of one embodiment of the steps performed by the process control 134 in handling values determined to have changed during the monitoring by the hardware control 136. When a value read by the hardware control 136 monitoring the process hardware 106 is determined to have changed 1104, the hardware control 1102 reports the changed value to the process control 1106. The process control 134 has a routine that receives the changed value. This routine looks up the device 1202 to determine the device that corresponds to the I/O point with the changed value. In one embodiment, a map cross-referencing I/O points to devices known to the process control 134. Once the device is determined 1202, the value is updated 1204. In one embodiment, this is accomplished by storing the new value. Finally, the routine performs any special processing required 1206. In one embodiment, the changed value initiates an event that executes another routine that performs some action appropriate to the device being monitored. In another embodiment, the value is latched. For example, a power supply is monitored for its status. If the status changes from "powered up" to "tripped," the status is latched as tripped until a reset is performed, regardless of the power supply being restored to a powered up condition.

FIG. 13 illustrates a flow diagram of one embodiment of the steps performed by the controller 104 when sending information to the process hardware 106. The process control 134 determines the type 1302 of the data to be sent. If the value of the data to be sent is digital data, such as a signal to open a valve or start a pump or a control value to be sent digitally, the next step is to convert the value 1304 to the digital value the specific piece of process hardware 106 requires to receive to perform the action. For example, if a temperature controller expects to receive a series of digital values corresponding to the set temperature, the convert value step 1304 formats the data such that it will be accepted by the specific piece of process hardware 106.

If the value of the data to be sent is analog data, such as a temperature setpoint for a controller, the next step is to scale the value 1306 to a digital value corresponding to the analog value the specific piece of process hardware 106 requires to receive to perform the action. For example, if an analog temperature controller expects to receive a voltage value between 0 and 1 volts, the step of scaling 1306 determines the digital value corresponding to the voltage, which is produced by a digital to analog converter (DAC) controlled by the hardware control 136. For example, digital values between 0 and 255 are mapped by the DAC to 0 to 1 volts, which the temperature controller interprets to a range of 100 to 200 degrees Celsius. After the valued is converted 1304 or scaled 1306, it is sent 1308 to the hardware control 136.

The hardware control 136 receives the value and looks up the I/O port 1312 for the device. In one embodiment, a cross-reference table of device, as known to the process control 134, to the specific piece of process hardware 106 provides information to identify or lookup the I/O port 1312. After the I/O port is identified 1312, the hardware control 136 sends the value to the device 1314. Because the hardware control 136 has identified the device 1312, the hardware control 136 knows how to send the data. For example, the digital temperature controller described above communicates via a serial interface to receive digital data consisting of numerical information. The hardware control 136 knows that a serial interface is being used and sends the appropriate data over that interface.

After the value is sent to the device 1314, the process control 136 checks for errors 1316. In one embodiment, the error checking 1316 is preformed by querying the device, that is, by sending a code to the device and verifying the response received. If no error is detected, the steps for sending information to the process hardware 106 is done 1320. If an error is detected, an error handler 1318 is invoked. In one embodiment, errors are handled based on the severity of the reported error. For example, if a valve reports that it did not change position, the error handler 1318 repeats sending the value to the device 1314. In another example, if the valve did not change position properly, the error handler 1318 aborts the process and runs a routine to restore the process hardware 106 to a predetermined configuration. In still another example, the error handler 1318 alerts the operator of the error and places the process in condition for the operator to take corrective action, such as manually position the valve.

Figure 14:
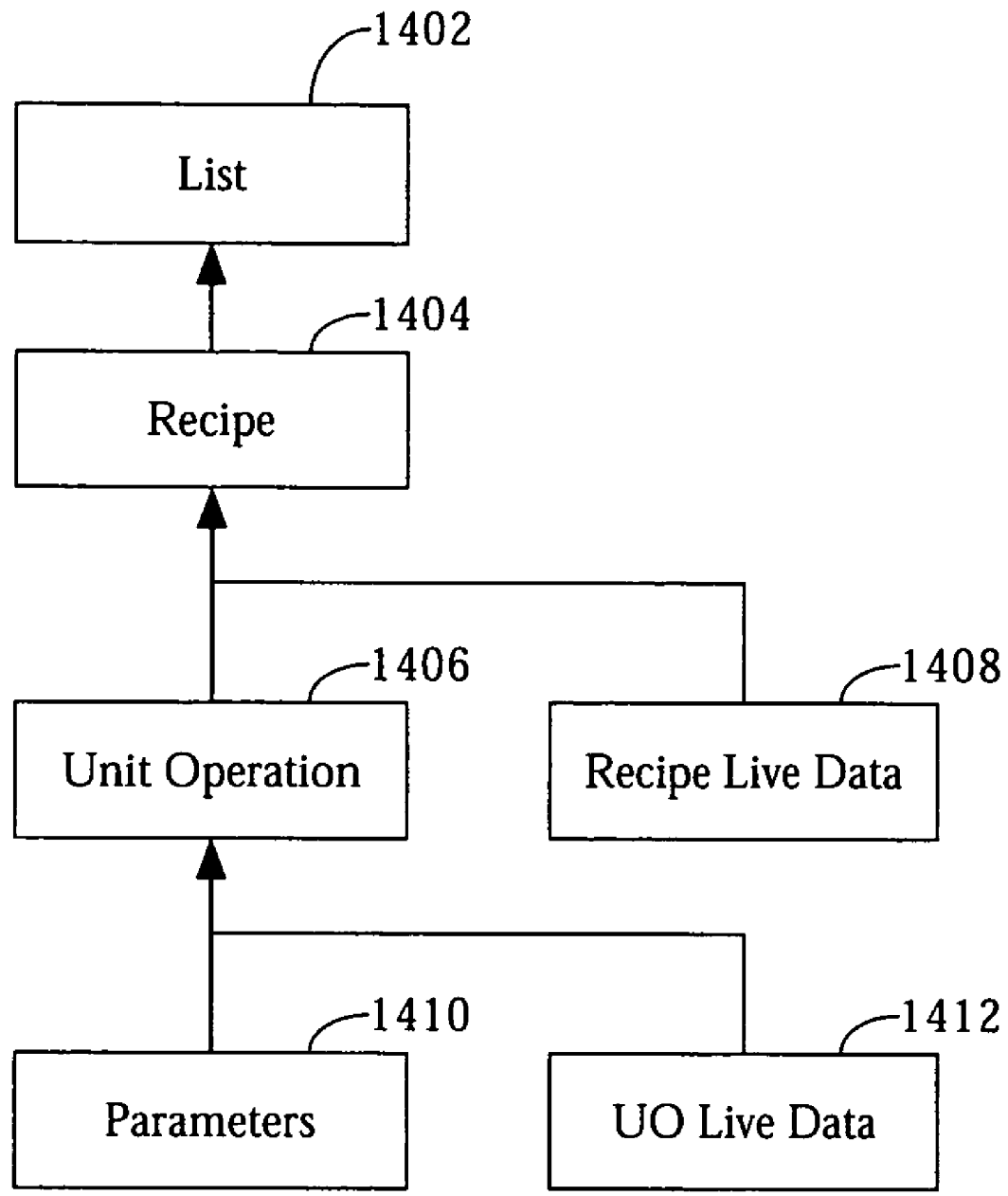
FIG. 14 is a class diagram of one embodiment of the class structure for the recipe class library.

FIG. 14 illustrates a class diagram of one embodiment of the class structure for the recipe class library. The recipe editor routine 118 running on the workstation 102 allows an operator to create and maintain one or more recipes 1404. In order to create and maintain the recipes 1404, the recipe editor routine 118 manipulates information relating to the recipe 1404 and unit operations 1406. Information relating to the one or more recipes 1404 is stored in a list 1402. Associated with each recipe 1404 are one or more unit operations 1406 and the recipe live data 1408. Associated with each unit operation 1406 are the unit operation parameters 1410 and the unit operation live data 1412.

The data relevant to each recipe 1404, in various embodiments, includes the recipe name or identifier, a version number, and other information, such as the reagent setup or process conditions necessary for the recipe 1404. The recipe live data 1408 includes information relating to the recipe state, that is, whether it is currently being executed, and the start and finish date and time.

The data relevant to each unit operation 1406, in various embodiments, includes the unit operation name, the conditions precedent, that is, whether it can only start after completion of the previous unit operation, and common parameters. The unit operation live data 1412 includes information relating to the recipe unit operation, whether it is currently being executed or is completed, and the start and finish date and time. In one embodiment, the data relevant to each unit operation 1406 includes identification of the required reagents. In another embodiment, the data relevant to each unit operation 1406 includes identification of a group or classification to which the unit operation 1406 belongs.

The data relevant to the unit operation parameters 1410 includes the specific values appropriate to the unit operation, including the units. For example, one embodiment of the evaporate unit operation includes parameters for upper and lower chamber temperature in degrees Celsius, temperature threshold in degrees Celsius, and the purge time in seconds.

The recipe live data 1408 and the unit operation live data 1412 provides information useful for the instrument view 112 and the data tracing and logging 114 features of the GUI 110. In one embodiment, the recipe 1404, along with a plurality of unit operations 1406 and parameters 1410 are passed from the workstation 102 to the controller 134 as the recipe data 802 (illustrated in FIG. 8). The recipe live data 1408 and the unit operation live data 1412 is received from the controller 104 as the recipe state data 806.

Figure 15:
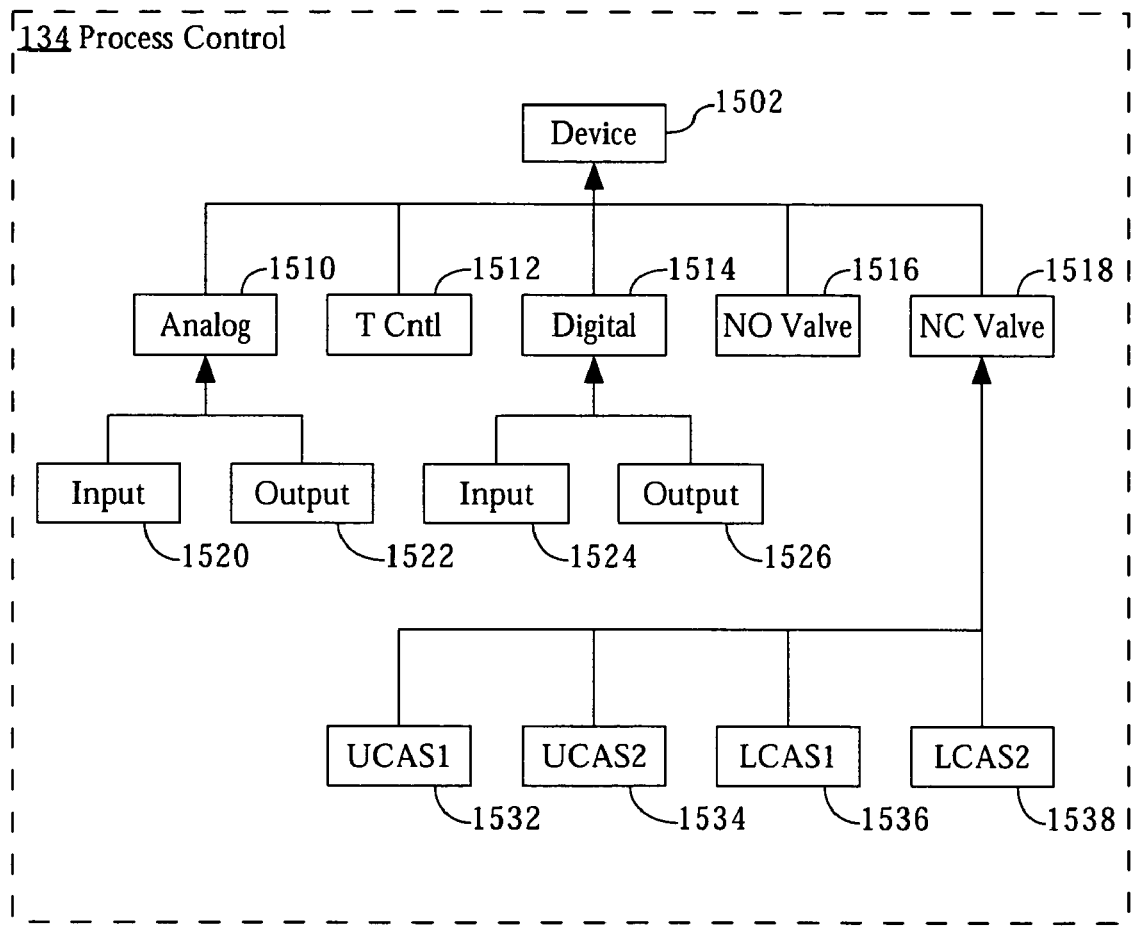
FIG. 15 is a class diagram of one embodiment of the classes for the process control.
Figure 16:
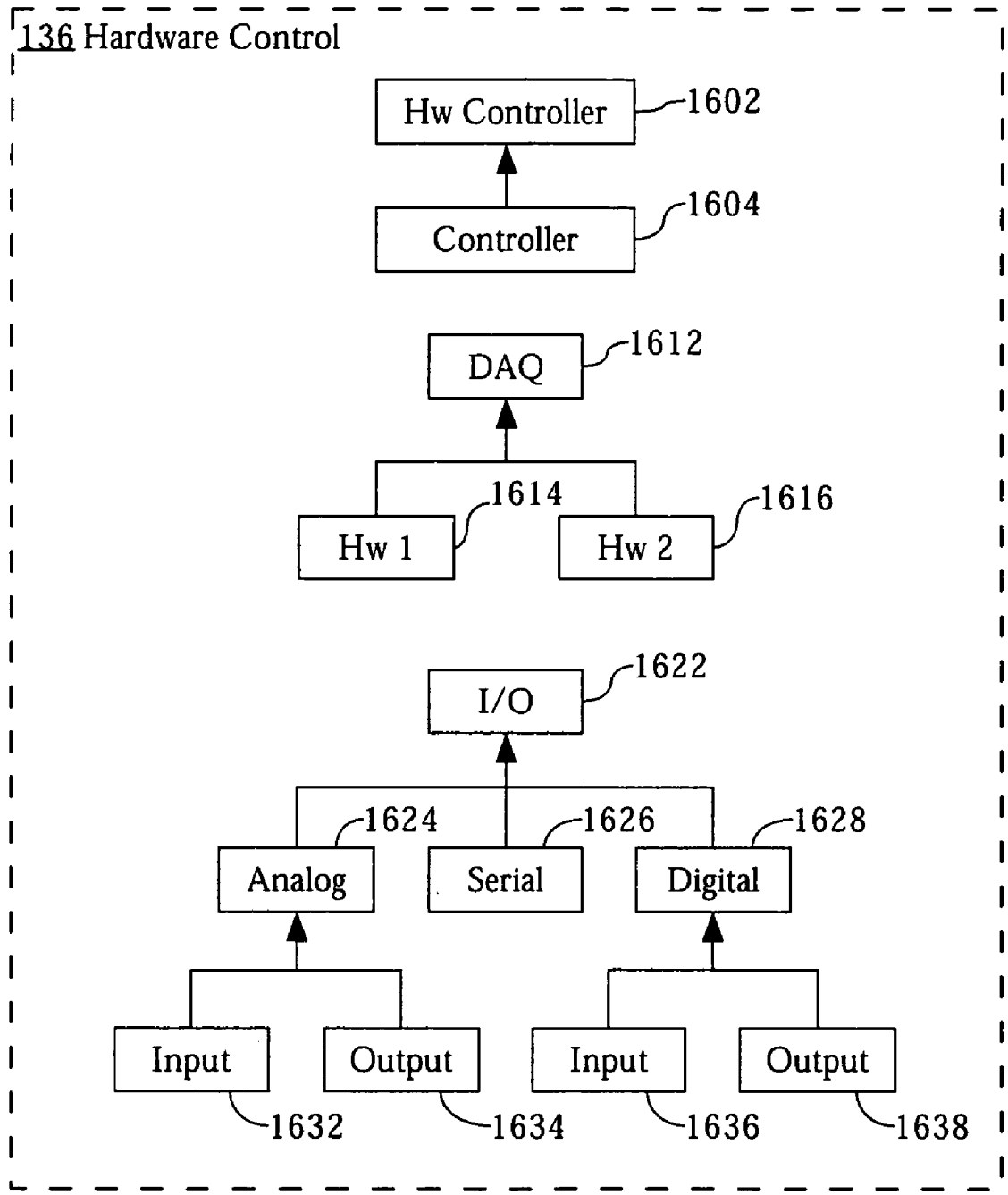
FIG. 16 is a class diagram of one embodiment of the class for the hardware control.

In the embodiment illustrated in FIGS. 14 through 16, the software and routines are based on an object oriented programming environment. The illustrated embodiment provides a background to discuss the flow of information and the structure and handling of data by the software. In another embodiment, the software is created using other programming techniques and environments.

FIG. 15 illustrates a class diagram of one embodiment of the classes for the process control 134. Each class includes properties and methods and sub-classes that inherit the properties and methods of the parent class. The properties include values and information relating to objects created or instantiated from the class. Methods are software routines that typically are specific to the objects instantiated from the class. The parent class is device 1502. A variety of sub-classes depend from the device class 1502. The sub-classes are specific to types of devices that form the process hardware 106. For example, the analog class 1510, with its input 1520 and output 1522 sub-classes, relate to devices that communicate through analog means. The digital class 1514, with its input 1524 and output 1526 sub-classes, relate to devices that communicate through digital means. Other sub-classes are created based on the type of devices, such as a temperature controller class 1512, a normally open valve class 1516, and a normally closed valve class 1518. The sub-classes are not limited to only those illustrated.

The temperature controller class 1512 includes methods, in various embodiments, for getting and setting the device state, handling status changes, setting the temperature, and/or setting and getting calibration information. The properties associated with objects under the temperature controller class 1512 includes, in various embodiments, the controller name or identifier, the set temperature, the current temperature, the status of the controller, and its current state. The valve classes 1516, 1518 include methods, in various embodiments, for returning the position of the valve, setting the position of the valve, getting and setting the device state, and handling status changes.

The objects instantiated under each class correlate to specific devices. For example, the normally closed valve class 1518 has four objects 1532, 1534, 1536, 1538 illustrated in FIG. 15. These four objects 1532, 1534, 1536, 1538 correspond to four valves in the process hardware 106. One object is an upper chamber air supply 1 valve object 1532 that corresponds to the valve 322 illustrated in FIG. 3. The other objects are an upper chamber air supply 2 valve object 1532 that corresponds to the valve 324 and two lower chamber air supply valves object 1536, 1538 that correspond to valves 326, 328.

FIG. 16 illustrates a class diagram of one embodiment of the class for the hardware control 136. The classes for the hardware control 136 software are divided into three categories, a category for controlling the hardware control 136, a category for data acquisition, and a category for communicating with the process hardware 106. In the first category, a hardware controller class 1602 has a sub-class for the controller 1604. The controller class 1604 includes the methods for interfacing with the other classes associated with the hardware control 136. In various embodiments, these methods include initializing, setting and getting values, controlling data acquisition, and providing status information.

The second category includes a data acquisition (DAQ) class 1612 that includes sub-classes 1614, 1616 for the types of hardware for implementing the data acquisition. In one embodiment, data acquisition is performed continuously with the data acquisition hardware scanning the I/O ports at a predetermined rate. For example, one sub-class (HW 1) 1614 is defined for a specific type of data acquisition board, such as a 16 port analog signal board, and another sub-class (HW 1) 1616 is defined for another specific type of data acquisition board, such as a 32 port digital signal board. These sub-classes 1614, 1616 include methods for adding and changing I/P points and initializing the boards.

The third category includes an I/O class 1622 that has sub-classes defined on whether the process hardware 106 is analog 1624, serial 1626, or digital 1628. These sub-classes are specific to the means of communication with the devices that form the process hardware 106. For example, the analog class 1624, with its input 1632 and output 1634 sub-classes, relate to devices that communicate through analog means. The digital class 1628, with its input 1636 and output 1638 sub-classes, relate to devices that communicate through digital means. These classes differ from the similarly named classes in the process control 134 in that these classes include methods for communicating directly with the process hardware 106. That is, these classes include the lowest level routines for communicating with hardware. For example, in various embodiments, the serial class 1626 includes methods for opening and closing a COM port, resetting and reading/writing a serial buffer, and reading and writing data to the port. The methods in the I/O class 1622 and sub-classes 1624 to 1638 are typically called by methods in the hardware controller class 1602 and controller sub-class 1604.

These methods are contrasted with the process control 134 methods and routines, which include higher level routines for handling devices at an abstract level. For example, the process control 134 methods are called to open a valve, whereas the hardware control 136 methods communicate and cause a valve to open by sending the proper signals through an I/O port.

The process control system 10 includes various functions. The function of receiving the recipe 702, 802 is implemented by the process control 134 running in the controller 104. FIG. 7 illustrates one embodiment of the steps for receiving the recipe 702, 704, 706. The function of initiating execution of the recipe is implemented by the process control 134 running in the controller 104. FIG. 7 illustrates one embodiment of the steps for initiating execution, which includes the steps of receiving a communication 702, determining that the communication is not data 704, but an execution command 708.

The function of executing a plurality of unit operations making up the recipe is implemented by the process control 134 running in the controller 104. FIG. 7 illustrates one embodiment of the steps for executing a recipe, including reading and executing the first unit operation 712, 714, reading the next unit operation 716 and executing it if it can be executed in parallel 718, 714 or waiting for the executing unit operations to be completed 720 before executing the sequential unit operation 714.

The function of data acquisition from selected devices of the process hardware 106 includes using objects instantiated from the data acquisition class 1612 and its subclasses 1614, 1616. In another embodiment, the function of data acquisition includes the steps 1102 to 1112 illustrated in FIG. 11.

The function of recipe editing is implemented by the workstation 102 running a recipe editor 116. FIG. 5 illustrates one embodiment of the steps of the recipe editor 116. The function of sending the recipe to a controller is implemented by the workstation 102 running an operations routine 118. FIG. 6 illustrates one embodiment of a loop for sending the recipe to the controller 104, including the steps of sending a unit operation 606 and repeating the sending step if there are more steps 608. The function of sending an execution command to a controller is implemented by the workstation 102 running an operations routine 118, which sends an execute command 610. The function of monitoring a process flow defined by the recipe is implemented by the workstation 102 running an instrument view routine 112. In another embodiment, the function of monitoring is implemented by the workstation 102 running a tracing/logging routine 114.

From the foregoing description, it will be recognized by those skilled in the art that a process control system 10 has been provided. The process control system 10 includes a controller 104 running software performing process control 134 and hardware control 136 functions. The controller 104 is adapted to connect to the process hardware 106, which performs the process flow as defined by a recipe. The controller 104 also communicates with a workstation 102 that runs software for monitoring 112, 114 and controlling 118 the process flow and for editing recipes 116.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. Apparatus for automating the production of a radiopharmaceutical by executing a sequence of process flow operations, said apparatus comprising:
a workstation having a processing component programmed to execute a process including the steps of:
providing a recipe editor for creating and maintaining a recipe, and
providing operations control for executing said recipe;
a controller having an input/output component and a processing component, said controller communicating with said workstation, said controller processing component programmed to execute a process including the steps of:
receiving a plurality of unit operations forming said recipe, each said unit operation describing a chemical process step,
executing said plurality of unit operations; and
process hardware in communication with said input/output component of said controller, said process hardware adapted to produce the radiopharmaceutical and including a reagent delivery system and a reaction vessel with an associated heating and purging system;
wherein said step of executing said plurality of unit operations includes the steps of:
executing one of said plurality of unit operations and starting a parallel group,
classifying a next one of said plurality of unit operations as one of a parallel operation and a sequential operation,
executing said parallel operation as part of said parallel group and repeating said step of classifying,
waiting for said parallel group to complete execution,
executing said sequential operation and starting a new parallel group, and repeating said step of classifying.

2. The apparatus of claim 1 wherein each of said plurality of unit operations describes a process flow step in terms of the chemical and physical steps to be performed.

3. The apparatus of claim 1 wherein each of said plurality of unit operations calls a software routine programmed to perform a set of instructions to manipulate said plurality of process hardware to perform a process flow step.

4. The apparatus of claim 1 wherein said workstation communicates said recipe and at least one command to a process control program being executed by said controller.

5. The apparatus of claim 1 wherein a process control program being executed by said controller communicates a recipe state and at least one device state to said workstation.

6. The apparatus of claim 1 wherein said process step of providing operations control being executed by said workstation processing component includes the steps of: selecting said recipe for execution from a library, sending said recipe to said controller, and sending an execute command to said controller.

7. The apparatus of claim 6 wherein said step of sending said recipe includes sending said plurality of unit operations to said controller.

8. The apparatus of claim 6 wherein said process step of providing operations control further includes the step of receiving a stream of data from said controller, said stream of data including a recipe state, at least one unit operation state, and at least one device state.

9. The apparatus of claim 6 wherein said process step of providing operations control further includes sending a reset command to said controller before said step of sending said recipe to said controller.

10. The apparatus of claim 1 wherein said controller processing component is programmed to execute a process further including receiving a reset command and initializing said controller before said step of receiving said plurality of unit operations.

11. The apparatus of claim 1 wherein said controller processing component includes a process control program and a hardware control program, said process control program including a step of communicating with said hardware control program.

12. The apparatus of claim 1 wherein said controller processing component includes a process control program and a hardware control program, said hardware control program having a plurality of instructions executable by the controller, said hardware control program including a step of communicating with said process control program and a step of communicating with said plurality of process hardware.

13. The apparatus of claim 1 wherein said controller processing component includes a process control program and a hardware control program, said process control program having a lookup table correlating each of said plurality of input/output points to a corresponding device, said process control program receiving data from one of said plurality of input/output points and said process control program executing a step to determine said corresponding device.

14. The apparatus of claim 1 wherein said controller processing component includes a process control program and a hardware control program, said hardware control program having a lookup table correlating each of said plurality of devices to each of said input/output points whereby said hardware control program receives instructions to be communicated to one of said plurality of devices and said hardware control program executes a step to determine said corresponding input/output point.

15. The apparatus of claim 1 wherein said controller processing component includes a process control program and a hardware control program, said hardware control program having a plurality of instructions executable by said controller processing component for data acquisition from a plurality of selected devices of said plurality of process hardware, and said hardware control program sending a plurality of acquired information to said process control program.

16. A method for automating a sequence of process flow operations, said method comprising:
receiving a recipe by a process control module, said recipe including a plurality of unit operations, each of said plurality of unit operations describing a process flow step in terms of at least one chemical and/or physical step to be performed;
executing said plurality of unit operations including the steps of:
executing one of said plurality of unit operations and starting a parallel group,
classifying a next one of said plurality of unit operations as one of a parallel operation and a sequential operation,
executing said parallel operation as part of said parallel group and repeating said step of classifying,
waiting for said parallel group to complete execution,
executing said sequential operation and starting a new parallel group, and
repeating said step of classifying.

17. The method of claim 16 wherein each of said step of executing said parallel operation and said step of executing said sequential operation includes the step of passing a set of data from said process control module to a hardware control module, said hardware control module performing a set of instructions to manipulate a plurality of process hardware to perform a process flow step.

18. The method of claim 16 further including a step of communicating a recipe state, at least one unit operation state, and at least one device state to a workstation.

19. The method of claim 16 further including a step of receiving a reset command and initializing the computer system before said step of receiving said recipe.

20. The method of claim 16 wherein said process control module communicates with a hardware control module responsible for providing an interface to a plurality of process hardware.

21. The method of claim 16 wherein said execution loop further includes a step of correlating one of a plurality of input/output points with one of a plurality of hardware devices, thereby allowing said process control module to communicate with a hardware control module.

22. The method of claim 16 wherein said execution loop further includes a step of correlating one of a plurality of hardware devices with one of a plurality of input/output points, thereby allowing a hardware control module to communicate with said process control module.

23. The method of claim 16 further including a step of performing data acquisition from a plurality of selected devices of a plurality of process hardware, said step of performing data acquisition performed by a hardware control module, sending a plurality of acquired information to said process control module from a hardware control module.

24. A computer system for automating a sequence of process flow operations, said computer system comprising:
a controller having an input/output component and a processing component, said input/output component for communicating with a workstation and process hardware, said processing component programmed to execute a process including the steps of:
receiving a recipe, said recipe including a plurality of unit operations, each of said plurality of unit operations describing a process flow step in terms of at least one chemical and/or physical step to be performed;
executing said plurality of unit operations including the steps of:
executing one of said plurality of unit operations,
determining if a next one of said plurality of unit operations is executable in parallel with said one of said plurality of unit operations and, if so, executing said next one of said plurality of unit operations and repeating said step of determining until said next one of said plurality of unit operations is determined not to be executable in parallel, and
waiting for execution of said one of said plurality of unit operations to be completed if said next one of said plurality of unit operations is determined not to be executable in parallel with said one of said plurality of unit operations.

25. The computer system of claim 24 wherein said step of executing one of said plurality of unit operations includes a step of passing a set of data to a hardware control module from a process control module, executing a set of instructions by said hardware control module to manipulate said plurality of process hardware to perform said process flow step defined by said one of said plurality of unit operations.

26. The computer system of claim 24 further including said workstation having a processing component, said workstation processing component programmed to execute a process including the steps of: providing a recipe editor for creating and maintaining said recipe, providing operations control for executing said recipe, and displaying at least one process variable during execution of said recipe.

27. The computer system of claim 24 further including said plurality of process hardware in communication with said input/output component of said controller and responsive to at least one control signal transmitted by said controller, said plurality of process hardware adapted to produce a radiopharmaceutical and including a reagent delivery system and a reaction vessel with an associated heating and purging system.

28. The computer system of claim 24 wherein said workstation communicates said recipe and at least one command to a process control program being executed by said controller.

29. The computer system of claim 24 wherein a process control program being executed by said controller communicates a recipe state, at least one unit operation state, and at least one device state to said workstation.

30. The computer system of claim 24 wherein said controller processing component is programmed to execute a process further including a step of receiving a reset command and initializing said controller before said step of receiving said plurality of unit operations.

31. The computer system of claim 24 wherein said processing component further executes a process step including correlating each of a plurality of input/output points to a corresponding one of a plurality of hardware devices whereby said process control module receives data from one of said plurality of input/output points and said process control module determines said corresponding one of said plurality of hardware devices.

32. The computer system of claim 24 wherein said processing component further executes a process step including correlating each of a plurality of hardware devices to a corresponding one of a plurality of input/output points whereby a hardware control module determines said corresponding one of said plurality of input/output points and said hardware control module communicates with one of said plurality of input/output points.

33. The computer system of claim 24 wherein said processing component further executes a process step including performing data acquisition from a plurality of selected devices of said plurality of process hardware, said step of performing data acquisition performed by a hardware control module, said hardware control module sending a plurality of acquired information to said process control module.

34. The computer system of claim 24, wherein said processing component includes a data structure comprising:
a list table containing a set of recipe data including a list of at least one recipe;
a recipe table containing a set of unit operation data including a list of a plurality of unit operations, said recipe table containing a set of recipe live data, said recipe live data including a recipe status, a recipe start time and date, and a recipe finish time and date; and
a unit operation table containing a set of parameters relating to each of said plurality of unit operations, said unit operation table containing a set of unit operation live data, said unit operation live data including a unit operation status, a unit operation start time and date, and a unit operation finish time and date.

35. The computer system of claim 24, further comprising a workstation performing the steps of:
   presenting to the user a first list of a plurality of available unit operations;
   presenting to the user a recipe list of a plurality of selected unit operations defining said recipe;
   presenting to the user a resource list including a plurality of resources based on said plurality of selected unit operations;
   allowing the user to add at least one of said plurality of available unit operations to said recipe list;
   allowing the user to delete at least one of said plurality of available unit operations from said recipe list; and
   allowing the user to edit the resources for one of said plurality of selected unit operations.

36. A controller for automating a sequence of process flow operations, said controller comprising:
   an input/output component adapted to communicate with a workstation and process hardware; and
   a processing component programmed to execute a process including the steps of:
      receiving a recipe including a plurality of unit operations, each of said plurality of unit operations describing a process flow step in terms of at least one chemical and/or physical step to be performed;
      executing said plurality of unit operations including the steps of:
         executing one of said plurality of unit operations and starting a parallel group,
         classifying a next one of said plurality of unit operations as one of a parallel operation and a sequential operation,
         executing said parallel operation as part of said parallel group and repeating said step of classifying,
         waiting for said parallel group to complete execution,
         executing said sequential operation and starting a new parallel group, and
         repeating said step of classifying.

37. The controller of claim 36 wherein said step of executing one of said plurality of unit operations, said step of executing said parallel operation, and said step of executing said sequential operation each including a step of passing a set of data to a hardware control module from a process control module, said hardware control module executing a set of instructions including a step of manipulating said plurality of process hardware to perform said process flow step.

38. The controller of claim 36 wherein a process control program being executed by said controller communicates a recipe state, at least one unit operation state, and at least one device state to a workstation.

39. The controller of claim 36 wherein said a process further includes receiving a reset command and initializing said controller before said step of receiving said recipe.

40. The controller of claim 36 further including the step of storing said recipe in a queue after said step of receiving said recipe.

41. The controller of claim 36 further including a correlating one of a plurality of devices to one of a plurality of input/output points, whereby a set of data is passed between a process control program and a hardware control program, said process control program dealing with said plurality of devices and said hardware control program dealing with said plurality of input/output points.

42. The controller of claim 36 wherein said processing component further includes a step for data acquisition from a plurality of selected devices of said plurality of process hardware.

43. A controller for automating a sequence of process flow operations, said controller comprising:
   an input/output component adapted to communicate with a workstation and process hardware;
   a process control program for executing a recipe including a plurality of unit operations, each of said plurality of unit operations describing a process flow step in terms of at least one chemical and/or physical step to be performed, said process control program receiving said recipe through said input/output component;
   a hardware control program for monitoring and controlling said process hardware through said input/output component, said process control program communicating with said hardware control program; and
   a processing component programmed to execute said process control program and said hardware control program;
   wherein said process control program is programmed to execute a process including the steps of: receiving said plurality of unit operations, each of said plurality of unit operations describing a process flow step in terms of at least one chemical and/or physical step to be performed; receiving a command to begin execution of said recipe, performing an execution loop wherein said plurality of unit operations are executed, said execution loop including the steps of:
   executing one of said plurality of unit operations and starting a parallel group, classifying a next one of said plurality of unit operations as one of a parallel operation and a sequential operation, executing said parallel operation as part of said parallel group and repeating said step of classifying, waiting for said parallel group to complete execution, executing said sequential operation and starting a new parallel group, and repeating said step of classifying.

44. The controller of claim 43 wherein said hardware control program is programmed to execute a process including the steps of: receiving a set of values from said process control program; sending a set of data to a selected device of said plurality of process hardware, said set of data corresponding to said set of values.

45. The controller of claim 43 wherein said hardware control program is programmed to execute a process including the steps of: receiving a set of data from a selected device of said plurality of process hardware; sending a set of values to said process control program, said set of data corresponding to said set of values.

46. The controller of claim 43 wherein said process control program includes a plurality of process objects representing a plurality of process elements, each of said plurality of process objects including at least one property and at least one method for manipulating one of said plurality of process elements.

47. The controller of claim 43 wherein said hardware control program includes a plurality of hardware objects each representing a hardware device from said plurality of process hardware, each of said plurality of hardware objects including at least one property and at least one method for directly monitoring and/or controlling said hardware device.

48. The controller of claim 43 wherein said process control program includes a plurality of process objects representing a plurality of process elements and said hardware control program includes a plurality of hardware objects each representing a hardware device from said plurality of process hardware, each of said plurality of process objects including at least one property and at least one method for manipulating one of said plurality of process elements, each of said plurality of hardware objects including at least one property and at least one method for directly monitoring and/or controlling said hardware device, said plurality of process objects communicating with said plurality of hardware objects.

49. The controller of claim 43 wherein said process control program and said hardware control program execute a process including a step of correlating one of a plurality of devices to one of a plurality of input/output points, whereby a set of data is passed between said process control program and said hardware control program, said process control program dealing with said plurality of devices and said hardware control program dealing with said plurality of input/output points.

50. The controller of claim 43 wherein said process control program passes a set of data to said hardware control program, said hardware control program executing a set of instructions manipulating said plurality of process hardware to perform said process flow step defined by said one of said plurality of unit operations.

51. The controller of claim 43 wherein said process control program executes a step of communicating a recipe state, at least one unit operation state, and at least one device state to a workstation.

52. The controller of claim 43 wherein said hardware control program performs data acquisition from a plurality of selected devices of said plurality of process hardware.

53. A computer programmed to execute a process for automating a sequence of process flow operations, said process comprising:
receiving a recipe including a plurality of unit operations, each of said plurality of unit operations describing a process flow step in terms of at least one chemical and/or physical step to be performed; and
executing said plurality of unit operations including the steps of:
executing one of said plurality of unit operations and starting a parallel group,
classifying a next one of said plurality of unit operations as one of a parallel operation and a sequential operation,
executing said parallel operation as part of said parallel group and repeating said step of classifying,
continuing execution of said parallel group until each of said plurality of unit operations in said parallel group is complete,
executing said sequential operation and starting a new parallel group, and
repeating said step of classifying.

54. The process of claim 53 further including a step of receiving a reset command and initializing the computer system before said step of receiving said recipe.

55. The process of claim 53 further including a step of communicating a recipe state, at least one unit operation state, and at least one device state to a workstation.

56. The process of claim 53 wherein said step of executing one of said plurality of unit operations, said step of executing said parallel operation, and said step of executing said sequential operation each includes a step of passing a set of data to a hardware control module from a process control module, said hardware control module performing a set of instructions manipulating said plurality of process hardware to perform said process flow step.

57. The process of claim 53 further including a step of performing data acquisition from a plurality of selected devices of a plurality of process hardware, said step of performing data acquisition performed by a hardware control module, said hardware control module sending a plurality of acquired information to a process control module.

58. The process of claim 53 further including a step of correlating one of a plurality of devices to one of a plurality of input/output points, whereby a set of data is passed between a process control program and a hardware control program, said process control program dealing with said plurality of devices and said hardware control program dealing with said plurality of input/output points.

59. A program storage device readable by a machine, storing a program of instructions executable by the machine to execute a sequence of process flow operations, said program instructions comprising:
instructions for performing an execution loop wherein a plurality of unit operations, each of said plurality of unit operations describing a process flow step in terms of at least one chemical and/or physical step to be performed, are executed, said execution loop including the steps of:
executing one of said plurality of unit operations and starting a parallel group,
classifying a next one of said plurality of unit operations as one of a parallel operation and a sequential operation,
executing said parallel operation as part of said parallel group and repeating said step of classifying,
waiting for said parallel group to complete execution,
executing said sequential operation and starting a new parallel group, and
repeating said step of classifying.

60. The method of claim 59 further including a step of receiving a reset command and initializing a controller before said step of receiving said recipe.

61. The method of claim 59 further including a step of communicating a recipe state, at least one unit operation state, and at least one device state to a workstation.

62. The method of claim 59 wherein said step of executing one of said plurality of unit operations, said step of executing said parallel operation, and said step of executing said sequential operation each include a step of passing a set of data to a hardware control module from a process control module, said hardware control module executing a set of instructions manipulating said plurality of process hardware to perform said process flow step.

63. The method of claim 59 further including a step of using a lookup table correlating one of a plurality of devices to one of a plurality of input/output points, whereby a set of data is passed between a process control program and a hardware control program, said process control program dealing with said plurality of devices and said hardware control program dealing with said plurality of input/output points.

64. The method of claim 59 further including a step of performing data acquisition from a plurality of selected devices of a plurality of process hardware.

65. Computer readable media tangibly embodying a program of instructions executable by a computer to perform a method of automating a sequence of process flow operations, said method comprising:
receiving a recipe including a plurality of unit operations, each of said plurality of unit operations describing a process flow step in terms of at least one chemical and/or physical step to be performed; receiving a command to begin execution of said recipe; and performing an execution loop wherein said plurality of unit operations are executed, said execution loop including the steps of: executing one of said plurality of unit operations, determining if a next one of said plurality of unit operations is executable in parallel with said one of said plurality of unit operations and, if so, executing said next one of said plurality of unit operations and repeating said step of determining until said next one of said plurality of unit operations is determined not to be executable in parallel, and waiting for execution of said one of said plurality of unit operations to be completed if said next one of said plurality of unit operations is determined not to be executable in parallel with said one of said plurality of unit operations.

66. Media as in claim 65 wherein said method further includes a step of receiving a reset command and initializing a controller before said step of receiving said recipe.

67. Media as in claim 65 wherein said method further includes a step of communicating a recipe state, at least one unit operation state, and at least one device state to a workstation.

68. Media as in claim 65 wherein said method further includes a step of using a lookup table to correlate one of a plurality of input/output points to one of a plurality of hardware devices.

69. Media as in claim 65 wherein said method further includes a step of performing data acquisition from a plurality of selected devices of a plurality of process hardware.

70. An interface for processing an automated sequence of process flow operations, the interface comprising computer readable program code devices for:

accepting a plurality of unit operations forming a recipe;

accepting an execute command to initiate execution of a loop wherein said plurality of unit operations are executed, said loop including the steps of:

executing one of said plurality of unit operations and starting a parallel group, classifying a next one of said plurality of unit operations as one of a parallel operation and a sequential operation, executing said parallel operation as part of said parallel group and repeating said step of classifying, waiting for said parallel group to complete execution, executing said sequential operation and starting a new parallel group, and repeating said step of classifying; and sending a data stream including a recipe state, a unit operation state, and at least one device state.

* * * * *